(12) United States Patent
Roberts et al.

(10) Patent No.: US 6,313,335 B1
(45) Date of Patent: Nov. 6, 2001

(54) ROOM TEMPERATURE CURABLE SILANE TERMINATED AND STABLE WATERBORNE POLYURETHANE DISPERSIONS WHICH CONTAIN FLUORINE AND/OR SILICONE AND LOW SURFACE ENERGY COATINGS PREPARED THEREFROM

(75) Inventors: Gary P. Roberts, Stillwater; Lowell W. Holland, St. Paul Park; Richard G. Hansen, Mahtomedi, all of MN (US); Ashok Sengupta, London (CA); George G. I. Moore, Afton; Miguel A. Guerra, Woodbury, both of MN (US)

(73) Assignee: 3M Innovative Properties, St. Paul, MN (US)

( * ) Notice: Subject to any disclaimer, the term of this patent is extended or adjusted under 35 U.S.C. 154(b) by 0 days.

(21) Appl. No.: 08/978,331

(22) Filed: Nov. 25, 1997

(51) Int. Cl.$^7$ ...................................................... C07F 7/10
(52) U.S. Cl. .............................. 556/419; 528/26; 528/28; 524/588; 524/589; 524/838; 525/440; 525/448; 428/391; 428/543; 428/544
(58) Field of Search ............................... 536/419; 528/26, 528/28; 524/589, 588, 838; 525/440, 446; 428/544, 543, 391

(56) References Cited

U.S. PATENT DOCUMENTS

| | | |
|---|---|---|
| 3,627,722 | 12/1971 | Selter ................................. 260/37 N |
| 3,632,557 | 1/1972 | Brode et al. ........................ 260/77.5 |
| 3,734,962 | 5/1973 | Niederprüm ......................... 260/556 |
| 3,814,716 | 6/1974 | Chang ............................. 260/29.2 M |
| 3,941,733 | 3/1976 | Kowalski et al. ............... 260/29.6 T |
| 3,983,291 | 9/1976 | Chang .................................... 428/290 |
| 4,567,228 | 1/1986 | Gaa et al. ............................ 524/588 |
| 4,582,873 | 4/1986 | Gaa et al. ............................ 524/591 |
| 4,598,131 | * 7/1986 | Prucnal ............................... 525/440 |
| 4,628,076 | * 12/1986 | Chang et al. ....................... 525/440 |
| 4,647,413 | 3/1987 | Savu ..................................... 260/544 |
| 4,670,608 | 6/1987 | Paetz et al. .......................... 568/709 |
| 4,806,694 | 2/1989 | Powell et al. ....................... 568/615 |
| 5,041,494 | 8/1991 | Franke et al. ....................... 524/588 |
| 5,274,159 | 12/1993 | Pellerite et al. .................... 556/485 |
| 5,298,060 | 3/1994 | Harakal et al. . |
| 5,354,808 | * 10/1994 | Onwumere et al. .................. 528/28 |
| 5,554,686 | * 9/1996 | Frisch et al. ........................ 524/588 |
| 5,679,754 | 10/1997 | Larson et al. ........................ 528/28 |
| 5,691,439 | 11/1997 | Slack et al. ............................ 528/49 |
| 5,750,630 | 5/1998 | Sengupta ................................ 528/59 |

FOREIGN PATENT DOCUMENTS

| | | |
|---|---|---|
| A-24848/97 | 6/1997 | (AU) . |
| 2024909 | 12/1971 | (DE) . |
| 0 339 862 | 11/1989 | (EP) . |
| 0305833B1 | 12/1992 | (EP) . |
| 0 814 105 A2 | 6/1997 | (EP) . |
| WO 94/13723 | 6/1994 | (WO) . |
| WO 95/21206 | 8/1995 | (WO) . |

OTHER PUBLICATIONS

Enviro$en$e (1994) "Fluorinated Ship–Hull Coatings for Non–Polluting Fouling Control"; Available: http://es/inel-.gov/new/funding/serdp/p2prj005.html; [Mar. 28, 1997].

J. Griffith, "Nontoxic Alternatives to Antifouling Paints," *Journal of Coatings Technology*, vol. 59 (755), 1987, pp 113–119.

A. Beca and G. Loeb, "Ease of Removal of Barnacles from Various Polymeric Materials," *Biotechnical and Bioengineering*, v. XXVI, John Wiley & Sons, Inc., 1984, p. 1245–1251.

*Polyurethanes: Chemistry and Technology*, Part I, Chapter 4, Table 30, Saunders and Frisch, Interscience Publishers, New York, 1963, pp 167–169.

J. W. Rosthauser and K. Nachtkemp, "Waterborne Polyurethanes," *Advances in Urethane Science and Technology*—vol. 10, ed. K. C. Frisch and D. Klempner, Technomics, 1987, p. 121–162.

Polymer Interface and Adhesion, Marcel Dekker Inc., 1982, p. 181, American Society for Testing and Materials (ASTM) Test Method D412–87.

Lindner, "Low Surface Free Energy Approach In The Control of Marine Biofouling," *Biofouling*, 1992, Hardwood Academic Polyurethane Publishers, vol. 99, pp. 193–205.

* cited by examiner

Primary Examiner—Paul F. Shaver
(74) Attorney, Agent, or Firm—Scott R. Pribnow

(57) ABSTRACT

Coatings are provided with very low surface energies provided by fluorine and/or silicone moieties. Aqueous dispersions of externally chain extended polyurethane compositions terminated by hydrolyzable and/or hydrolyzed silyl groups and containing dispersing or emulsifying groups, particularly carboxyl groups are provided. Also polyurethane dispersions which are substantially organic solvent free which cure to water and solvent resistant, tough, scratch resistant, preferably light stable polyurethane films are provided. Such films are useful as anti-fouling marine coatings. The compound $R_f R'_f CFCOOCH_2 C(R)(CH_2 OH)_2$ is provided.

74 Claims, No Drawings

ROOM TEMPERATURE CURABLE SILANE TERMINATED AND STABLE WATERBORNE POLYURETHANE DISPERSIONS WHICH CONTAIN FLUORINE AND/OR SILICONE AND LOW SURFACE ENERGY COATINGS PREPARED THEREFROM

FIELD OF THE INVENTION

The invention relates to novel dispersions comprising silane terminated urethanes containing fluorine and/or silicone moieties useful as surface adhesion preventers or release promoters for fouling agents on surfaces that need protection. The invention also relates to novel waterborne, low surface energy and room temperature curing coating compositions prepared therefrom.

BACKGROUND OF THE INVENTION

Fouling refers to the accumulation of airborne or waterborne biological materials on surfaces. Marine surfaces are especially prone to fouling, due to the affinity of marine organisms for areas at or below the waterline. In marine environments, fouling a involves surfaces on ship hulls, buoys, drilling platforms, pipes, and the like. Fouling build up on these surfaces can lead to a number of problems, such as increased weight or drag in the water, which, in the case of ships, can result in increased fuel consumption and operating costs.

The most common approach to prevention of marine fouling is through use of toxic antifouling coatings. The most commonly used antifouling coatings contain metallic toxicants, such as organo-tin or copper, which prevent marine organisms from attaching to the surface through release of the toxicant into the surrounding water. Such coatings may also contain an organic toxicant. A common form of these coatings, known as ablative antifouling coatings, wear away as the ship's hull passes through the water. This ablative action constantly brings fresh toxicant to the surface, until the toxicant concentration falls below a critical level, at which point the coating becomes ineffective. In order to restore the coating, the ship must be dry-docked and go through a recoating process.

A major concern of the use of antifouling coatings is the impact the leaching metallic toxicant poses to the environment. The use of organotin-based coatings has been found to kill, or at least severely restrict, the growth of marine life. This is especially true in areas of high ship traffic, such as harbors, bays, and estuaries. The use of copper based antifouling coatings is also being scrutinized for environmental hazards. It has been estimated that a ship having 3250 square meter hull area releases approximately 0.91 kg of copper per day, which is sufficient to bring approximately 18.9 million liters of sea water to toxic copper concentrations. ("Fluorinated Ship-Hull Coatings for Non-Polluting Fouling Control"; http://inel.gov/new/funding/serdp/p2prj005. html; May 30, 1996). Restrictions as to release of toxins into the environment are in place in certain areas. In addition to these problems, hulls coated with copper based coatings may experience the need for more frequent recoating than or anotin-based coatings.

Organic toxicants are considered to be less of a problem in this regard, since they tend to decompose to non-hazardous materials over time in water. Health hazards to dock workers exposed to organotin compounds and disposal of large quantities of toxic waste generated from removal of coatings during dry docking provide additional constraints to the use of or canotin-based antifouling coatings.

An alternative to the toxicant release approach is providing a coating or surface to which fouling organisms have difficulty adhering. Ideally, the turbulence created by the motion of the ship through water or simple cleaning methods would remove fouling organisms.

Pioneering work conducted by J. Griffith, "Nontoxic Alternatives to Antifouling Paints," *Journal of Coatings Technology*, vol 59 (755), 1987, pp 113–119, demonstrated that low surface energy coatings derived from fluoropolymers can function as fouling release coatings. Although these coatings demonstrated the principle of fouling release, certain marine organisms such as barnacles adhered strongly to the surface, requiring a cleaning step to remove them.

A. Beca and G. Loeb ("Ease of Removal of Barnacles from Various Polymeric Materials," *Biotechnical and Bioengineering*, v. 26, p. 1245–1251, 1984) studied the attachment of barnacles to a variety of polymeric surfaces and concluded that barnacles attached to a low surface energy surface were easier to remove than those attached to surfaces with higher surface energy. Researchers have also demonstrated through testing that marine organisms, in particular barnacles, attach more strongly to hard plastics than they do to soft elastomers.

A low surface energy approach was also demonstrated by Lindner, ("Low Surface Free Energy Approach In The Control of Marine Biofouling," *Biofouling*, 1992, Hardwood Academic Polyurethane Publishers, Vol. 99, pp. 193–205) who calculated coating surface energies based on contact angles with water and other liquids, and correlated them with contact angles critical to prevention of fouling by marine organisms. The higher the contact angle with water, the lower the surface energy of the coating surface. These materials were exemplified with oriented monolayers of perfluorinated surfactants fixed by polymers on the surface and by comb-like polymers with perfluorinated side chains. The preparation of a durable, water-borne polymer was not exemplified by this disclosure.

These studies confirm the need for a low surface energy surface, but also indicate that other factors, such as low glass transition temperature ($<-20°$ C.) and elastomeric nature of the coating also play an important role in governing adhesion of marine organisms to polymeric surfaces.

Many commercially available silicones also contain leachable additives or residuals, which slowly move to the surface to form a weak boundary layer, resulting in easier removal of fouling organisms. Often, this additive is a silicone fluid.

While silicone coatings meet the requirements of low surface energy, low glass transition temperature, and elastomeric nature, there are major drawbacks to their use. These include poor abrasion resistance, tensile strength, and tear strength. These drawbacks result in susceptibility to mechanical damage. Also, silicone coatings do not exhibit good resistance to marine grasses and algae. Other potential problems with commercially available silicone fouling release coatings may include high solvent content and high material cost. Application cost may be high due to the necessity of multiple coats of dissimilar layers in order to achieve acceptable adhesion. Many of the silicone products are multi-component, requiring on-site mixing and pot life concerns.

Teflon™ filled materials, such as epoxies and vinylesters, are available, but they have a high glass transition temperature, are non-elastomeric, and are not low enough in surface energy to prevent strong adhesion of marine fouling organisms.

Polyurethanes have achieved commercial acceptance in surface finishing systems because of their overall balance of properties such as abrasion resistance, flexibility, toughness, high gloss, as well as mar and organic solvent resistance. Early commercial systems were either solvent based one-component reactive high solids prepolymers reacted with a second component, organic solvent-based moisture curing compositions or fully reacted urethane lacquers generally dissolved in alcohols and/or aromatic solvents.

In an effort to eliminate organic solvents and their associated emission and handling problems, waterborne urethane coatings were developed. Aqueous poly(urethane/urea) dispersions are binary colloidal systems in which a discontinuous polyurethane phase is dispersed in a continuous aqueous phase. Aqueous poly(urethane/urea) dispersions have been known for a long time. They are becoming increasingly important in coating and adhesive applications due to environmental and safety regulations of organic solvent based systems. Aqueous poly(urethane/urea) dispersions can be formulated using little or no co-solvent to produce high performance coatings and adhesives at ambient temperatures. They not only replace organic solutions but find applications in new areas as well. For instance, they are not aggressive towards plastic surfaces and provide excellent adhesion to glass and polymeric fibers due to their ionomeric nature.

Other advantages include: low toxicity (no free isocyanate), environmental acceptability, low viscosity at high molecular weights, tolerance to pH changes, elevated temperature stability, freeze/thaw stability, mechanical stability, compatibility with other materials, one component application, low temperature curing, excellent film forming properties, and typical polyurethane coatings performance.

The selection of starting materials suitable for making poly(urethane/urea) dispersions is essentially the same as that for conventional polyurethanes. Aqueous polyurethane dispersions are prepared with the aid of an external emulsifier or by forming polyurethane ionomers by incorporating internal emulsifier segments either into the backbone (e.g., quaternary ammonium groups) or pendant (e.g., carboxylate or sulfonate groups). The ionic groups can be anionic, cationic or zwitterionic and a wide variety of neutralizing counter ions may be used. When the polyurethane ionomers are dispersed in water, particles form which contain a core of aggregated soft segments with the ionic sites located predominantly on the surface. A very stable dispersion results. Stability of the dispersion is the result of the electrostatic repulsion of like charges between double layers of different particles. Particle size in stable film forming dispersions is 30–800 nm. The viscosity of the dispersion is dependent on the polyurethane particle size and solids content, degree of phase separation and independent of the polyurethane molecular weight (MW).

During film formation of polyurethane dispersions, water evaporates and the polyurethane particles coalesce to form a continuous film. The addition of plasticizers or high boiling coalescent solvents such as N-methylpyrrolidinone improve the film forming properties in some systems. Film formation properties also improve with elevated temperatures. The physical properties of the film are controlled by the selection of starting materials. The two areas where aqueous polyurethane dispersions tend to be inferior to solvent borne two-component polyurethanes are in water resistance and organic solvent resistance. The ionomeric nature of the polyurethane dispersions which makes them water dispersible, makes the film hydrophilic to some degree. Increasing the crosslink density of the polyurethane increases organic solvent resistance but highly branched prepolymers have very high viscosities and produce polymers with high glass transition temperatures (Tg) which have poor film forming properties.

Methods to improve the water resistance and organic solvent resistance of aqueous polyurethane dispersions have been developed. Grafting of hydrophobic unsaturated monomers (e.g., acrylates) onto polyurethane dispersions containing unsaturated polyester polyols is one method. The carboxylic acids on anionic polyurethane dispersions can be crosslinked by the addition of external crosslinkers. Polyfunctional aziridines, methoxymethylolated melamines or urea resins, carbodiimides, and polyisocyanates or blocked isocyanates are used. These become two-part systems with an associated pot life. Also, many of the crosslinkers are toxic and/or require elevated temperatures for cure. By incorporating reactive species onto the polyurethane backbone or on the interior of the dispersed polymer particle, self-crosslinking aqueous polyurethane dispersions can be made. Aqueous uralkyd resins can be produced which cure by free radical reactions of unsaturated hydrocarbons with atmospheric oxygen in the presence of metallic driers. Other methods of internal crosslinking involve final molecular weight buildup of the prepolymer at time of final application. High prepolymer viscosities and the poor film formation associated with highly crosslinked particles are avoided by these methods. These methods require that the film be baked, however. Most of these methods involve a "blocked" isocyanate which, at elevated temperatures unblocks and reacts with the carboxylic acid groups or amines. These self-crosslinking dispersions contain both reactive species as a "one-part" system. Aqueous polyurethane oligomers are available with only one reactive moiety. The most common of these are amino, hydroxyl or blocked isocyanate functional urethanes. A wide variety of coreactants are available.

Aqueous silane terminated urethane/urea dispersions are waterborne urethane/urea oli comers which have been capped with an alkoxy-functional silane. Silane terminated urethane/urea dispersions are normally stabilized by incorporating internal emulsifier segments into the backbone, typically carboxylate groups, with a corresponding trialkylammonium counter ion. When silane terminated urethane/urea dispersions are applied to a substrate and dried, the silanol groups condense to form a hydrophobic crosslinked coating.

Silane terminated urethane dispersions are described in U.S. Pat. Nos. 3,632,557; 3,627,722; 3,814,716; 4,582,873; 3,941,733; 4,567,228; 4,628,076; 5,041,494; 5,354,808 and European Patent Application No. 0305833 B1.

Curable water-borne silane terminated urethanes are described in Frisch et al., U.S. Pat. No. 5,554,686. These materials exhibit superior properties of water and sunlight resistance over standard, air dry water-borne urethanes. Because these materials cure as they dry, they also exhibit shorter tack free and dust free times than standard, air dry water-borne urethanes. Urethanes formed from fluorinated polyether polyols are disclosed in a list of polyols but are not exemplified. Silicone containing polyols are not disclosed. Neither fluorine nor silicone containing chain extender components or polyisocyanate components are disclosed. Low surface energy coatings are not disclosed.

Curable water-borne silane terminated urethanes with a backbone of alkoxy terminated polydimethylsiloxane (PDMS) diols are described in PCT application WO 95/21206 (Sengupta et al.) and EP 0742803 which are assigned to 3M. These materials are useful as low adhesion backsides for tape applications. These materials are not useful for marine applications or other applications where contact with water will occur (such as outdoor applications) due to their water absorbing properties. These materials do not contain silicone or fluorine in a chain extender or polyisocyanate component.

SUMMARY OF THE INVENTION

A need thus exists for a stable, curable, one component polyurethane composition containing fluorine, silicone or a combination thereof, and hydrolyzed or hydrolyzable silyl groups, which reduces the content of expensive and polluting solvents for application, which is film forming, and which is capable of providing low surface energy and hydrophobic polyurethane coatings. A need also exists for such a composition which can be formulated to be moisture resistant, be elastomeric in nature, possess a glass transition temperature in at least one segment of <−20° C., and exhibit short tack-free and dust-free times. A need also exists for polyurethane coatings which are antifouling o in marine environments. We have discovered such a composition and coating.

Much work has been done in the area of fluorinated/silicone solvent and water-based coatings. Solvent-based fluorinated coatings tend to become brittle. Previously known coatings containing only silicone tend to have less desirable water resistance and/or mechanical properties. A surprising aspect of this invention is that we can incorporate silicones and/or fluorine into polyurethanes without the above-mentioned problems. We can produce water-resistant and abrasion-resistant silicone-containing films and flexible fluorine-containing films. When including both fluorine and silicone, we achieve the best properties of both. In order to achieve antifouling a properties in a coating, it would be desirable to have a polyurethane composition containing fluorine, silicone, or both fluorine and silicone. In order to achieve film integrity in these polyurethane compositions, it would be desirable to have silyl groups capable of crosslinking o upon application.

It is also desirable that the performance life of the coating be longer than currently available with copper-based ablative antifouling coatings. It is believed that the performance of the coating should depend primarily on its low surface energy, below 35, preferably below 25 dynes/cm and most preferably below 18 dynes/cm. We have discovered materials which provide the aforementioned properties. The materials of the current invention contain fluorine or silicone or a combination thereof, and yield materials with low surface energy and depending on formulation decreased water absorption during immersion. These coatings do not depend on metallic toxicants, but may optionally contain organic toxin antifouling agents and/or inert non-toxic leachable antifouling agent(s) such as silicone fluid.

We have discovered that certain hydrolyzable and/or hydrolyzed silyl-terminated fluorine containing polyurethanes, silicone containing polyurethanes and fluorine/silicone containing polyurethanes in aqueous dispersion, when coated onto a marine type substrate and dried, inhibit the attachment of and/or facilitate the removal of marine organisms from this surface.

Aqueous polyurethane dispersions of the invention are found to be stable to shear, to have enhanced chemical and mechanical stability, and to have relatively low viscosities even at high polymer concentrations. They present reduced hazards and costs as compared to known polyurethane solutions because of their lower solvent contents. Because they are aqueous, there are no problems associated with continuous maintenance of anhydrous conditions prior to use. The dispersion of the invention may, for example, be anionically, cationically, amphoterically, or nonionically stabilized. Films formed from these dispersions are free from the problems associated with the presence of surfactants which are encountered with films formed from conventional externally emulsified dispersions.

The dispersion of the present invention comprises polymer of formula (I)

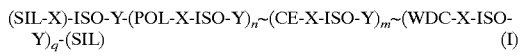

$$(SIL-X)-ISO-Y-(POL-X-ISO-Y)_n \sim (CE-X-ISO-Y)_m \sim (WDC-X-ISO-Y)_q-(SIL) \qquad (I)$$

wherein (POL-X-ISO-Y), (CE-X-ISO-Y), and (WDC-X-ISO-Y) can be randomly distributed or form blocks;
wherein SIL independently represents

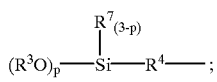

$R^3$ is independently selected from the group consisting of hydrogen; alkyl groups comprising about 1 to about 4 carbon atoms; acyl groups comprising about 2 to about 5 carbon atoms; and oxime groups of the formula —N═CR$^5$R$^6$, wherein R$^5$ is independently selected from the group consisting of monovalent alkyl groups comprising about 1 to about 12 carbon atoms and wherein R$^6$ is independently selected from the group consisting of monovalent alkyl groups comprising about 1 to about 12 carbon atoms;

$R^7$ is independently selected from the group consisting of monovalent alkyl groups comprising about 1 to about 12 carbon atoms;

$R^4$ is independently selected from the group consisting of divalent radicals comprising about 2 to about 20 carbon atoms, wherein said $R^4$ radicals contain no isocyanate reactive functional groups;

p independently represents an integer of 1 to 3;

X is independently selected from the group consisting of divalent radicals selected from the group consisting of

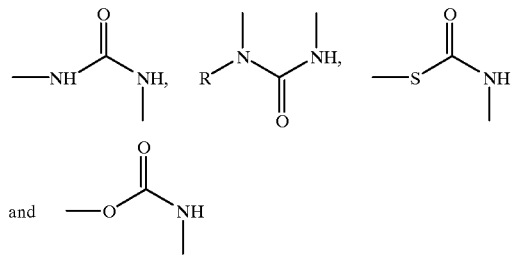

wherein R is independently selected from the group consisting of phenyl, linear aliphatic groups comprising about 1 to about 12 carbon atoms, branched aliphatic groups comprising about 1 to about 12 carbon atoms, and cycloaliphatic groups;

ISO independently represents a moiety derived from a polyisocyanate component comprising a compound having 2 isocyanate groups and optionally further comprising a compound having greater than 2 isocyanate groups;

wherein each ISO moiety is optionally fluorinated and optionally contains silicone;

Y is independently a divalent radical selected from the group consisting of

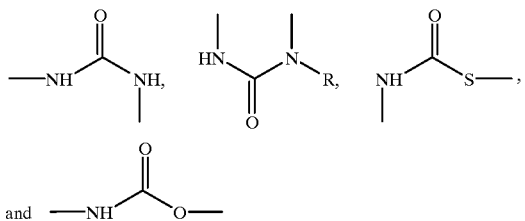

and wherein R is as defined above;
POL independently represents a moiety derived from a component comprising a first compound having 2 isocyanate reactive functional groups selected from the group consisting of polyols, polyamines and polythiols, each isocyanate reactive functional group having at least one active hydrogen, and optionally a second compound having greater than 2 isocyanate reactive functional groups, selected from the group consisting of polyols, polyamines, and polythiols, each isocyanate reactive functional group having at least one active hydrogen,
  wherein at least one of the following of (i), (ii) and (iii) is true:
    (i) at least one POL moiety contains fluorine;
    (ii) at least one POL moiety contains silicone;
    (iii) at least one POL moiety contains both fluorine and silicone;
n represents an integer of about 2 to about 85;
CE independently represents a moiety derived from a chain extender component comprising a difunctional chain extender having 2 isocyanate reactive functional groups, each isocyanate reactive functional group having at least one active hydrogen, and optionally a polyfunctional chain extender having at least 3 isocyanate reactive functional groups, each isocyanate reactive functional group having at least one active hydrogen;
wherein each CE moiety is optionally fluorinated and optionally contains silicone;
m represents an integer of about 1 to about 84;
WDC independently represents a moiety derived from a water dispersing compound, wherein the water dispersing compound possesses at least one water dispersing group and at least two isocyanate reactive functional groups, each isocyanate reactive functional group containing at least one active hydrogen;
q represents an integer of about 2 to about 85;
  wherein at least one of the following is true:
    at least one ISO moiety contains fluorine;
    at least one ISO moiety contains silicone;
    at least one ISO moiety contains both fluorine and silicone;
    at least one CE moiety contains fluorine;
    at least one CE moiety contains silicone;
    at least one CE moiety contains both fluorine and silicone;
  wherein a sufficient amount of at least one of the following:
    (i) fluorine;
    (ii) silicone;
    (iii) fluorine plus silicone;
  is present in the dispersion such that a coating of the dispersion has a surface energy of less than 35 dynes/cm.

The polyurethane dispersions of the invention are substantially organic solvent free (e.g., less than about 7 weight percent organic solvent) and cure to water and solvent resistant, tough, scratch resistant, preferably light stable polyurethane films.

The present invention also provides an elastomer comprising the cured dispersion of the invention.

The present invention also provides an article comprising a substrate coated with the cured dispersion of the invention.

The present invention also provides a composition comprising:
(a) about 80 to about 99.9 percent by weight of the dispersion of the invention, which comprises the polymer of formula (I);
(b) about 0.1 to about 10 percent by weight of a photostabilizer;
(c) 0 to about 10 percent by weight of a surfactant;
(d) about 0.1 to about 10 percent by weight of a thickening agent;
(e) about 0.1 to about 10 percent by weight of a coalescing solvent;
(f) about 0.1 to about 20 percent by weight of a silane compound reactive with the polymer of formula (I);
(g) 0 to about 20 percent by weight of a component selected from the group consisting of pigments, dyes, and mixtures thereof;
(h) 0 to about 5 percent by weight of a crosslinker;
(i) 0 to about 5 percent by weight of an antioxidant;
(j) 0 to about 10 percent by weight of an organic biocide;
(k) 0 to about 30 percent of plasticizer; and
(l) 0 to about 20 percent of a non-toxic leachable inert silicone fluid antifouling agent; wherein the weight percentages are based upon the total weight of the coating composition and total 100%.

The present invention also provides an article comprising a substrate coated with the composition of the invention.

The present invention also provides an article comprising a substrate coated with the cured composition of the invention.

The present invention also provides the article wherein the substrate is selected from the group consisting of boat hulls, buoys, pipes, tape, rope, drilling platforms, piers, docks, oil production rigs, sea walls and fish nets.

The present invention also provides the article wherein the substrate is selected from the group consisting of leather, woven webs, nonwoven webs, glass, glass fibers, rope fibers, wood, metals, plastics, metal alloys and composite materials.

The present invention also provides the article wherein the substrate is a composite material selected from the group consisting of concrete and fiberglass and the metal alloy is selected from a group consisting of aluminum and steel.

The present invention also provides the article wherein the composition further comprises a photostabilizer.

The present invention also provides a compound of the formula

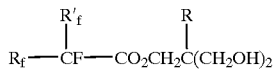

wherein $R_f$— and $R'_f$ are independently selected from perfluorinated alkyl groups of one to 20 carbon atoms optionally containing 1–6 ether oxygens or together form a perfluorinated 5–7 membered carbocyclic ring optionally substituted with perfluorinated alkyl groups comprising 1 to 4 carbon atoms, and R is lower alkyl of 1 to 4 carbon atoms. In a preferred embodiment $R_f$ is selected from $C_nF_{2n+1}(O)_x$— wherein n=4 to 10 and x=0 or 1 and $R_f$ can optionally further comprise up to three catenary ether atoms; $R'_f$ is selected from the group consisting of —$CF_3$ and —$C_2F_5$; and R is methyl or ethyl. In a most preferred embodiment $R_f$ is a $C_4$ to $C_6$ fluoroalkyl; $R'_f$ is a $C_1$ to $C_3$ fluoroalkyl; and R is a $C_1$ to $C_2$ alkyl.

Description of Term

The term "silicone" as used herein includes polydiorganosiloxanes (and moieties derived therefrom) wherein each organo group is independently selected from the group consisting of alkyl groups (such as $C_1$ to $C_{12}$ alkyl groups, for example), fluorinated alkyl groups (such as $C_1$ to $C_{12}$ fluorinated alkyl groups, for example), and fluoroalkoxyalkylene groups (such as $C_1$ to $C_{12}$ fluoroalkoxyalkylene groups, for example).

DETAILED DESCRIPTION OF THE INVENTION

The term polyurethane, or sometimes polyurethane-polyurea, refers to a polymeric material, the backbone of which comprises a multiplicity of urethane linkages,

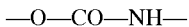

and may also contain one or more urea linkages:

and may also contain one or more thiocarbamate linkages:

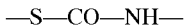

and combinations thereof.

We have discovered that water absorption should be low in order to minimize chances in coating physical properties after prolonged immersion or exposure to wet environments.

Surface Energy

It is preferred that sufficient fluorine and/or silicone content is present in the dispersion of the invention such that surface energy of a coating of the dispersion is less than 25 dynes/cm. It is more preferred that sufficient fluorine and/or silicone content is present such that surface energy of a coating of the dispersion is less than 20 dynes/cm. It is most preferred that sufficient fluorine and/or silicone content is present such that surface energy of a coating of the dispersion is less than 18 dynes/cm. The fluorine and/or silicone may be contained in the polymer of formula (I) or both the polymer of formula (I) and a silane compound reactive with the polymer of formula (I).

Polymer of Formula (I)

As mentioned previously, the dispersion of the invention comprises polymer of formula (I). The dispersion may, for example, be anionically, nonionically, amphoterically, or cationically stabilized. To anionically stabilize the polymer, with respect to WDC, the water dispersing group may be reacted with a basic salt forming compound.

The polymer of formula (I) possesses a fluorinated segment(s) and/or a silicone containing segment(s), and/or a silicone/fluorinated segment(s). Dispersions containing such polymers yield materials with lower surface energy and depending on the formulation decreased water absorption during, immersion.

With respect to the polymer of formula (I) sufficient polyisocyanate component may be included to provide an excess on an isocyanate equivalent basis of about 1.4 to about 4 times the combined active hydrogen equivalent of the isocyanate reactive functional groups of the component from which a POL moiety can be derived, the water solubilizing compound, and the chain extender component.

It is also preferred for the polymer of formula (I) that n represents an integer of about 3 to about 65; m represents an integer of about 2 to about 64, and q represents an integer of about 3 to about 65. It is most preferred that n represents an integer of about 4 to about 15; m represents an integer of about 2 to about 64; and q represents an integer of about 4 to about 15.

It is also preferred for the polymer of formula (I) that $R^3$ is selected from the group consisting of ethyl and methyl, p is 3; and $R^4$ comprises 2 to 4 carbon atoms.

The externally chain-extended silyl-terminated polyurethanes contained in the dispersions and compositions of the invention are composed of several moieties. Urethane moieties, optional urea moieties, and optional thiocarbamate moieties link together generally divalent polyisocyanate-derived moieties, POL moieties, chain extender-derived moieties, and solubilizing moieties in the chain along with monovalent terminal silyl moieties. Polyisocyanate-derived moieties are the radicals derived from polyisocyanates having at least two isocyanate functional groups and polyisocyanate adducts having at least two isocyanate functional groups by the reaction of the isocyanate groups. POL moieties are the radicals formed by reaction of isocyanate-reactive functional groups on the polyols, polyamines, and/or polythiols. Similarly, chain extender-derived moieties are the radicals derived from poly(active hydrogen), isocyanate-reactive organic compounds (e.g., polyols, polyamines and polythiols). Water-dispersing ionic compounds and silyl compounds yield dispersing moieties and silyl moieties by elimination of isocyanate-reactive groups. The polyurethane molecule as a whole is thus made up of recurring polyisocyanate-derived moieties, polyol-derived moieties, chain extender derived moieties, and interspersed dispersing moieties, generally terminated by silyl moieties. To some extent, of course, two or more molecules in aqueous dispersion may be connected by siloxane linkages.

In general, the silane-terminated polyurethane dispersions are prepared by first forming a polyurethane prepolymer by combining a polyisocyanate component with isocyanate reactive compounds. This prepolymer is then dispersed in a water phase which typically provides chain extension and silane termination of the polyurethane prepolymer. A summary of basic polyurethane chemistry and technology can be found, for example, in *Polyurethanes: Chemistry and Technology*, Saunders and Frisch, Interscience Publishers (New York, 1963 (Part I) and 1964 (Part II)).

The polyurethane prepolymers useful in the present invention can be prepared by reacting an excess of a polyisocyanate component on an isocyanate equivalent basis with one or more components from which a POL moiety can be derived and at least one isocyanate-reactive water-dispersing compound in the presence of an optional catalyst and/or a coalescing solvent. One or more additional optional components, such as chain extenders, blocking agents and isocyanate-reactive silane compounds, may be included in the polyurethane prepolymer. For example, isocyanate-terminated polyurethane prepolymers may be modified to include a chain extender to form a chain extended isocyanate-terminated polyurethane prepolymer, a blocking agent to form a blocked isocyanate terminated polyurethane prepolymer, a polyfunctional chain extender or polyisocyanate adduct to form a branched isocyanate terminated polyurethane prepolymer, and/or an isocyanate-reactive silane compound to form a silane-terminated polyurethane prepolymer.

In various instances multifunctional components with functionality greater than two may be incorporated into the urethane dispersion in limited amounts. The introduction of multifunctional components may provide advantages to a coating made from the finished dispersion such as improved solvent resistance. Generally, if too much multifunctionality is introduced, it may be difficult or impossible to make a dispersion without some coagulation occurring. The amount of any multifunctionality should not be such to prevent preparation of a stable dispersion.

It is important that the prepolymer prepared contain more than one isocyanate radical in the reaction mixture for each active hydrogen radical contributed by the polyol component, the water dispersing compound, and other isocyanate reactive compounds in the prepolymer. "Active hydrogens" are those nucleophilic hydrogen atoms which conform to the Zerewitinoff determination of hydrogen atoms; i.e., compounds which, when reacted with a solution of methylmagnesium iodide in purified n-butyl ether, produce methane. Typically, isocyanate reactive groups having at least one active hydrogen include but are not limited to those selected from the group consisting of —OH, —NH$_2$, —SH, and —NHR, wherein R is selected from the group consisting of phenyl, straight or branched aliphatic groups comprising from about 1 to about 12 carbon atoms, and cycloaliphatic groups. Isocyanate equivalent to active hydrogen equivalent ratios of about 1.4:1 to about 4:1 are suitable in the polyurethane prepolymers. Ratios of less than about 1.4:1 tend to produce films formed from the polyurethane dispersions of the present invention which can have low cohesive strength and are softer than desirable for most applications. Ratios higher than about 4:1 provide a high combined chain extender/isocyanate-reactive silane content when these components are added in the water phase of the polyurethane dispersion. As a result, the final coatings tend to be hard and stiff.

This required excess of isocyanate present in the prepolymer is then consumed by condensation with the active-hydrogen containing isocyanate reactive compounds in the water phase when the polyurethane prepolymer is dispersed. If an external chain extender is introduced in the water phase and little or no chain extension due to water is desired, then the active-hydrogens contributed by either difunctional or polyfunctional chain extenders typically represent on an equivalent basis from about 65 to about 95% on an equivalent basis of the excess of isocyanate, while the isocyanate-reactive silane compound is present in the amount of about 5% to about 30% on an equivalent basis of the excess isocyanate. If no chain extender is incorporated in the water phase of the dispersion, then theoretically 100% of the remaining isocyanate groups react with the active hydrogens found in the isocyanate reactive silane compounds. However, if a minor degree of chain extension due to water is desired, then from about 85 to about 100 percent, preferably about 95 to about 100 percent, of the isocyanate excess can be reacted with the active hydrogens supplied by the chain extenders and isocyanate reactive compounds. In this situation, the remainder of the isocyanate excess can form urea linkages with other prepolymers by a secondary reaction, first reacting with water to form a carbamic acid which then converts to a primary amine and carbon dioxide. This primary amine then forms a urea linkage with any available isocyanate group in the dispersion.

The dispersions of the invention typically form useful and processable coatings at solids content ranging from about 3 to about 60% by weight solids, generally from about 3 to about 40% by weight solids.

Polyisocyanates

Each ISO moiety of formula (I) is optionally fluorinated and/or optionally contains silicone. As one example, at least one isocyanate moiety may be fluorinated. As another example, at least one isocyanate moiety may contain silicone. Thus, depending on the formulation none, some or all of the ISO moieties are fluorinated and/or contain silicone. The polyisocyanate component from which an ISO moiety is derived must comprise a compound having two isocyanate groups (i.e., diisocyanates and/or adducts thereof) and may optionally comprise compounds having greater than two isocyanate groups (e.g., triisocyanates and/or adducts thereof). Adducts of the polyisocyanate compounds as defined herein refer to isocyanate functional derivatives of polyisocyanate compounds and polyisocyanate prepolymers. Examples of adducts include but are not limited to those selected from the group consisting of ureas, biurets, allophanates, dimers and trimers of isocyanate compounds, uretidinediones, and mixtures thereof. Any suitable organic polyisocyanate, such as an aliphatic, cycloaliphatic, araliphatic or aromatic polyisocyanate, may be used either singly or in mixtures of two or more. The aliphatic isocyanates provide generally better light stability than the aromatic compounds. Aromatic polyisocyanates, on the other hand, are generally more economical and reactive toward polyols and other poly(active hydrogen) compounds than aliphatic polyisocyanates. The polyisocyanates may be fluorinated and/or contain silicone.

Suitable aromatic polyisocyanates include but are not limited to those selected from the group consisting of 2,4-toluene diisocyanate, 2,6-toluene diisocyanate, a dimer of toluene diisocyanate (available under the trademark Desmodur™ TT from Miles Coating Division), diphenylmethane 4,4'-diisocyanate (MDI), 1,5-diisocyanatonaphthalene, 1,4-phenylene diisocyanate, 1,3-phenylene diisocyanate, fluorinated and/or silicone containing derivatives of the aforementioned, and mixtures thereof.

Examples of useful cycloaliphatic polyisocyanates include but are not limited to those selected from the group consisting of dicyclohexylmethane diisocyanate ($H_{12}$MDI, commercially available as Desmodur™ W from Miles Coating Division), isophorone diisocyanate (IPDI), 1,4-cyclohexane diisocyanate (CHDI), 1,4-cyclohexanebis (methylene isocyanate) (BDI), 1,3-bis(isocyanatomethyl) cyclohexane ($H_6$XDI), fluorinated and/or silicone containing derivatives of the aforementioned, and mixtures thereof.

Examples of useful aliphatic polyisocyanates include but are not limited to those selected from the group consisting of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, fluorinated and/or silicone containing derivatives of the aforementioned, and mixtures thereof.

Examples of useful araliphatic polyisocyanates include but are not limited to those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, fluorinated and/or silicone containing derivatives of the aforementioned, and mixtures thereof.

Preferred polyisocyanates, in general, include those selected from the group consisting of isophorone diisocyanate, toluene diisocyanate, dicyclohexylmethane 4,4'-diisocyanate, MDI, derivatives of all the aforementioned, fluorinated and/or silicone containing derivatives of the aforementioned, and mixtures thereof.

Polyisocyanates or polyisocyanate adducts containing more than two isocyanate groups in the molecule can be included to introduce branching into the prepolymer which enhances the solvent resistance, water resistance and hardness of coatings made from these polyurethane dispersions; however, a predominance of diisocyanates is required. Limited amounts of polyisocyanates containing greater than 2 isocyanate groups can be employed. Typical isocyanates from this group include but are not limited to those selected from the group consisting of triphenylmethane 4,4',4"-triisocyanate, tris-(4-isocyanatophenyl)-thiophosphate, fluorinated and/or silicone containing derivatives of the aforementioned and the like. Similarly, limited amounts of polyisocyanate adducts containing more than two isocyanate groups can be employed, including but not limited to those selected from the group consisting of trimer of isophorone diisocyanate (Polyisocyanate IPDI-T 1890, commercially available from Hüls America), and trimer of HDI (commercially available as Desmodur™ N3300 from Miles Polymer Division), trimer of m-tetramethylxylene diisocyanate (a trifunctional polyisocyanate adduct of trimethylolpropane and m-tetramethylxylene diisocyanate available as Cythane™ 3160 from American Cyanamid Co.) fluorinated and/or silicone containing derivatives of the aforementioned.

The isocyanate-derived moiety of the polyurethane is thus a polyvalent organic radical of from about 2 to about 100 carbon atoms free from isocyanate-reactive or hydroxyl-reactive groups, e.g., —OH, —SH, —NH$_2$, —NHR, —CO$_2$H, —COCl, —SO$_3$H, —SO$_2$Cl, etc., wherein R is selected from the group consisting of phenyl, straight or branched aliphatic groups comprising from about 1 to about 12 carbon atoms, and cycloaliphatic groups. Preferably, R is a lower alkyl group comprising 1 to 4 carbon atoms.

In addition, blocked polyisocyanates made from the above can be used. A blocked polyisocyanate can be prepared by reacting one of the above polyisocyanates with a blocking agent. Typical isocyanate blocking agents include but are not limited to those selected from the group consisting of phenol, nonyl phenol, methyl ethyl ketoxime, sodium bisulfate, and ε-caprolactam. These blocked prepolymers can be used in conjunction with diamines or diamine precursors such as ketamines.

As mentioned previously, each ISO moiety of formula I is optionally fluorinated and/or optionally contains silicone. A particularly useful fluorinated ISO moiety may be derived, for example, from a polyisocyanate component represented by the formula

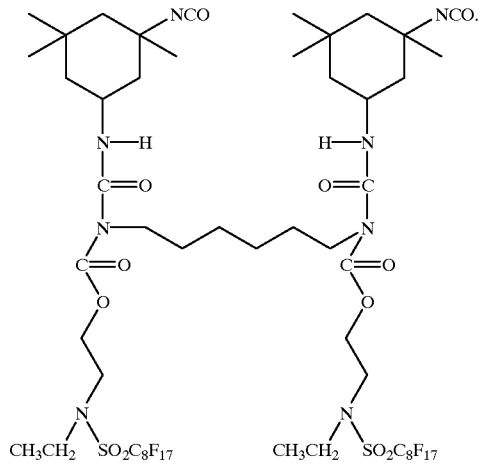

A silicone containing ISO moiety may be derived, for example, from a polyisocyanate component represented by the formula

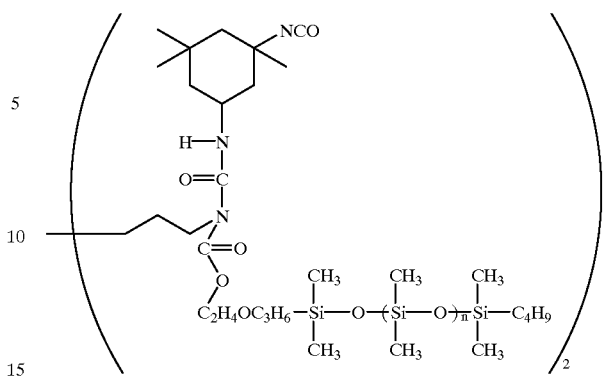

wherein n represents an integer of 3 to 50. For example, n may be selected such that the molecular weight (number average) of the component is about 1000.

POL Moiety

A POL moiety is derived from a component comprising a first compound having two isocyanate reactive functional groups (diols, diamines, dithiols, etc. and/or derivatives thereof) and optionally further comprising a second compound having greater than two isocyanate reactive groups (triols, tetrols, triamines, trithiols, etc. and/or derivatives thereof), each isocyanate reactive group having at least one active hydrogen;

wherein at least one of the following is true: at least one POL moiety contains fluorine; at least one POL moiety contains silicone; at least one POL moiety contains both fluorine and silicone.

Illustrative silicone and fluorine containing components from which POL can be derived include the following classes of compounds:

(i) fluorinated polyols such as fluorinated diols (such as fluorinated polyethers);

(ii) silicone polyols such as silicone diols;

(iii) fluorinated polyamines;

(iv) silicone polyamines;

(v) fluorinated polythiols;

(vi) silicone polythiols; and (vii) mixtures thereof.

An example of a useful silicone polyether copolymer diol may be represented by the formula

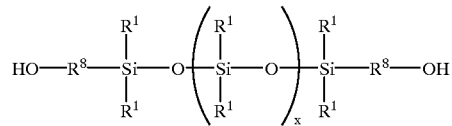

wherein the silicone polyether diol has two terminal hydroxy groups, wherein $R^8$ is independently selected from the group consisting of divalent alkyl groups of up to about 60 carbon atoms, divalent polyester groups of up to about 60 carbon atoms, and divalent oxyalkylene groups of up to about 60 carbon atoms, wherein the oxyalkylene groups contain 0 to 3 ethylene oxide units, wherein the atom of each $R^8$ group which is attached directly to the hydroxy group is a carbon atom; $R^1$ is independently selected from the group consisting of $C_1$–$C_{10}$ alkyl, fluoroalkyl, and fluoroalkoxyalkyl groups and x is an integer of from 2 to 100.

$R^8$ may, for example, be an oxyalkylene group comprising butylene oxide units, an oxyalkylene group comprising propylene oxide units, or an oxyalkylene group containing 0 to 3 ethylene oxide units.

An example of a useful silicone polyether copolymer diol is

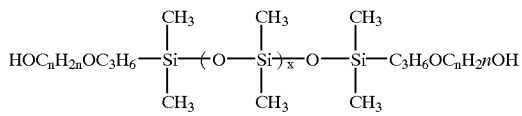

wherein n is independently 2 to 6; and
x is an integer of 2 to 100.

The silicone polyether copolymer diol may be, for example,

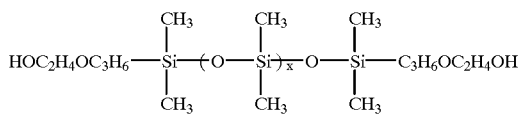

wherein x is an integer of from 2 to 100.

Polysiloxaneglycol of the following formula are disclosed in European Patent Application No. 89103729.3, Publication No. 0 332 065 A3, (filed Mar 3, 1989) and are believed to be useful according to the present invention.

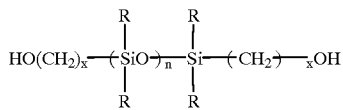

wherein R may be a lower alkyl group, branched or unbranched, of about 1–6, preferably 1–3, carbon atoms, x may be an integer of about 2–10, preferably 2–6, most preferably 3–4, n may be an integer such that the molecular weight (presumably number average) of the polyglycol may be from about 600 to 60,000, preferably from about 1000 to 5000, most preferably about 2000. According to the aforementioned European application, such polyglycols are conventionally referred to as hydroxyalkyl terminated silicone fluids. They may be purchased from, for example, Silar Laboratories, Scotia, N.Y. The reference also refers to a hydroxybutyl terminated polydimethylsiloxane of molecular weight about 2000 which is also believed to be useful according to the present invention.

A diol component may, for example, be a fluorinated polyether diol independently selected from the group represented by the formula

wherein the oxyperfluoroalkylene groups —$(C_iF_{2i}O)$—, —$(C_yF_{2y}O)$—, and —$(C_zF_{2z}O)$— are randomly distributed or grouped in blocks in a chain;
i is an integer from 1 to 10;
j is an integer from 0 to 100;
k is an integer from 1 to 100;
p is an integer from 0 to 100;
y is an integer from 1 to 10;
z is an integer from 1 to 10;
each $R_f$ is independently selected from the group consisting of divalent perfluoroalkyl groups comprising from 1 to 20 carbon atoms;
each Q is independently selected from the groups consisting of —$C_6H_4$—, —$C_6H_3Cl$—, —$C_2H_4OCH_2$— and —$C_bH_{2b}$—;
each Q' is independently selected from the group consisting of —$C_6H_4$—, —$C_6H_3Cl$—, —$C_bH_{2b}$—, and —$CH_2OC_2H_4$—; and
each b is independently selected from the group consisting of integers of 1 to 20.

As another example, a polyol component may be a fluorinated polyether diol independently selected from the group represented by the formula

wherein
k/j=0.8 and the number average molecular weight of the fluorinated polyetherdiol is 2000.

As another example, a polyol component may be a fluorinated diol independently selected from the group represented by the formula

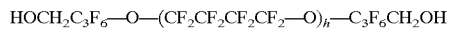

wherein h is an integer from 0 to 30. Typically h is selected such that the number average molecular weight of the polyol is about 400 to about 3000, preferably about 800 to about 1500.

As another example, the diol may be a fluorinated diol independently selected from the group represented by the formula

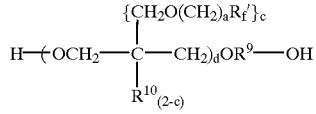

wherein a is independently an integer from 1 to 5;
c is 1 or 2;
d is an integer from 2 to 250;
$R^9$ is selected from the group consisting of $C_2$ to $C_5$ alkylene and $C_2$ to $C_5$ isoalkylene;
$R^{10}$ is independently selected from the group consisting of H and alkyl groups comprising 1 to 4 carbon atoms;
$R_f'$ is independently selected from the group consisting of a linear $C_2$ to $C_{10}$ perfluoroalkyl, branched chain $C_2$ to $C_{10}$ perfluoroalkyl, haloalkyl comprising 1 to 20 carbon atoms, haloisoalkyl comprising 1 to 20 carbon atoms, and oxaperfluorinated polyether segments comprising 4 to 60 carbon atoms.

Preferably, for the above mentioned fluorinated diol, $R_f'$ is

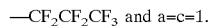

Another preferred fluorinated diol described above is that in which $R_f'$ is

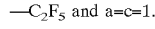

Another preferred fluorinated diol described above is that in which $R_f'$ is

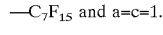

As another example, the diol may be a fluorinated diol independently selected from the group represented by the formula

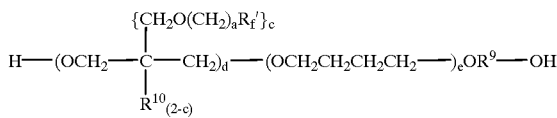

wherein
e is an integer selected such that the weight fraction of —(OCH$_2$CH$_2$CH$_2$CH$_2$)— is 0 to about 70 weight percent of the diol;
a is independently an integer from 1 to 5;
c is 1 or 2;
d is an integer from 2 to 250;
R$^9$ is selected from the group consisting of C$_2$ to C$_5$ alkylene and C$_2$ to C$_5$ isoalkylene;
R$^{10}$ is independently selected from the group consisting of H and alkyl groups comprising 1 to 4 carbon atoms;
R$_f'$ is independently selected from the group consisting of a linear C$_2$ to C$_{10}$ perfluoroalkyl, branched chain C$_2$ to C$_{10}$ perfluoroalkyl, haloalkyl comprising 1 to 20 carbon atoms, haloisoalkyl comprising 1 to 20 carbon atoms, and oxaperfluorinated polyether segments comprising 4 to 60 carbon atoms.

Representative examples of useful polyols are disclosed in UK Patent Application GB 2 269 816 A.

As another example, the diol may be a fluorinated diol independently selected from the group represented by the formula

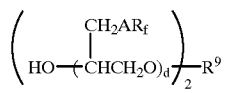

wherein
A is independently selected from the group consisting of —OC$_g$H$_{2g}$— (wherein g is 1 to 12, preferably 1 or 2) and —N(R$^{11}$)SO$_2$—;
d is an integer from 2 to 250;
R$^9$ is selected from the group consisting of alkylene groups comprising at least 2 carbon atoms (preferably 2 to 12 carbon atoms) and isoalkylene groups comprising at least 2 carbon atoms (preferably 2 to 5 carbon atoms);
R$^{11}$ is an alkyl of C$_1$ to C$_6$;
R$_f$ is independently selected from the group consisting of a linear C$_2$ to C$_{10}$ perfluoroalkyl, branched chain C$_2$ to C$_{10}$ perfluoroalkyl, haloalkyl comprising 1 to 20 carbon atoms, haloisoalkyl comprising 1 to 20 carbon atoms, and oxaperfluorinated polyether segments comprising 4 to 60 carbon atoms.

Preferably, R$_f$ is C$_8$F$_{17}$ when A is —N(CH$_3$)SO$_2$— and R$_f$ is C$_7$F$_{15}$CH$_2$ when A is —OCH$_2$—. Preferably R$^{11}$ is —CH$_3$.

The fluorinated polyol component typically has a number average molecular weight of about 500 to about 35,000, preferably about 1,000 to about 10,000.

In one example the POL moiety may be derived from a fluorinated polyether polyol independently selected from a group represented by the formula HOCH$_2$, CH$_2$CH$_2$CHR (OCHRCH$_2$CH$_2$CHR)$_x$OCHRCH$_2$CH$_2$OH wherein each R is independently selected from the group consisting of —H, —CF$_2$CHFR$_f$ wherein each R$_f$ is independently selected from the group consisting of —(CF$_2$)$_n$F wherein n=0–8 and

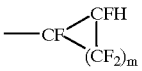

wherein m=2 to 4, such that 5–60 weight percent of the diol weight is fluorine and x=0–70.

In one example each R$_f$ may be —CF$_3$.

Other representative examples of components from which POL can be derived include:
(i) the polyester diols, including, for example, factone polyols and the alkylene oxide adducts thereof;
(ii) the polyether diols, including, for example, polyoxyalkylene polyols, polyoxycycloalkylene polyols, polythioethers, and alkylene oxide adducts thereof; and
(iii) specialty diols including but not limited to those selected from the group consisting of polybutadiene diols, hydrogenated polybutadiene polyols, poly carbonate polyols, hydroxy alkyl derivatives of bisphenol A such as bis(2-hydroxyethyl) bisphenol A, polythioether polyols, fluorinated polyether diols, amine-terminated polyether polyols, amine terminated polyester polyols, and acrylic polyols.

The term "alkylene oxide" includes, for example, ethylene oxide, 1,2-epoxypropane, 1,2-epoxybutane, 2,3-epoxybutane, isobutylene oxide, epichlorohydrin, mixtures thereof, and the like.

The molecular weight of the component from which a POL moiety is derived is one significant factor in determining the final properties of the polyurethane; generally, the higher the molecular weight of the component, the softer the resulting polyurethane. The term "molecular weight" is used (other than in the glossary) herein to refer to the number average molecular weight (M$_n$). Components such as polyols, polythiols, and polyamines of molecular weight as low as 250 and as high as about 35,000 produce useful products, molecular weight ranges of about 500 to about 5000 being preferred and most readily commercially available.

The POL moiety of the polyurethane is thus a polyvalent organic radical of from about 10 to about 1000 carbon atoms free from isocyanate-reactive or hydroxyl reactive groups.

The component from which a POL moiety is derived is preferably independently selected from the group consisting of fluorinated polyols such as fluorinated polyether polyols, silicone containing polyols such as silicone polyether copolymer diols, amine terminated silicone, poly (oxypropylene) glycols, ethylene oxide capped poly (oxypropylene) glycols, poly(oxytetramethylene) glycols, μ-omega-diamino poly(oxypropylene), aromatic amine-terminated poly(oxypropylene) glycols, graft-polyether polyols, poly(oxyethylene) polyols, polyglycol adipates, polyethylene terephthalate polyols, polycaprolactone polyols, polybutadiene polyols, hydrogenated polybutadiene polyols, μ-omega-diamino poly(oxytetramethylene), polythioether polyols, polybutylene oxide polyols, polyoxytetramethylene/ethylene oxide random copolymer polyols, acrylic polyols, polycarbonate polyols, and mixtures thereof.

Water-Dispersing Compounds

Another component used in preparing the isocyanate terminated prepolymer is a water-dispersing compound. The water dispersing compound possesses at least one water dispersing group and at least one isocyanate reactive functional group, each isocyanate reactive functional group containing at least one active hydrogen. Preferably, each compound has two isocyanate reactive groups which are connected through an organic radical to each other and to a water-dispersing group. Suitable water-dispersing groups are carboxyl, sulfate, sulfonate, phosphonate, ammonium, including quaternary ammonium, polyethylene oxide (PEO) and the like. Preferred isocyanate-reactive hydrogen atoms are those which react readily with an isocyanate group at or below about 75° C. such as the hydrogen atoms of aliphatic hydroxyl, aliphatic mercapto, aliphatic amino, and aromatic amino groups and are not those hydrogens present in the water dispersing group which could be considered active hydrogens under certain circumstances. Hydrogen atoms which react slowly, such as the "acidic" hydrogen atoms in amido groups, and sterically hindered or very slow reacting acidic hydrogen atoms such as the carboxylic acid group of dimethylpropionic acid are not included.

A suitable water-dispersing compound is represented by the formula $(HR^{16})_2R^1A$ in which $R^1A$ is a water-dispersing moiety; $R^{16}$ is selected from the group consisting of O,S, NH, and NR; $R^1$ represents a trivalent organic linking group comprising about 2 to about 25 carbon atoms which may include tertiary nitrogen or ether oxygen atoms and is free from isocyanate-reactive hydrogen containing groups; A is a water dispersing ionic group such as those selected from the group consisting of $—SO_3M$, $—OSO_3M$, $—CO_2M$, $—PO(OM)_3$, $—NR_2 \cdot HX$, and $—NR_3X$, wherein M is H or one equivalent of a monovalent or divalent soluble cation such as sodium, potassium, calcium, and $NR_3H^+$, wherein X is a soluble anion such as those selected from the group consisting of halide, hydroxide, and deprotonated carboxylic acid, and R is selected from the group consisting of a phenyl group, cycloaliphatic group, or a straight or branched aliphatic group having from about 1 to about 12 carbon atoms. Preferably, R is a lower alkyl group comprising 1 to 4 carbon atoms. The group $—NR_3X$ represents a quaternary ammonium substituent which is a salt of water dispersible acid, such as trimethyl ammonium chloride, pyridinium sulfate, etc. or ammonium substituent and the group $—NR_2 \cdot HX$ which is salt of a water soluble acid, such as dimethyl ammonium acetate or propionate. A representative suitable dispersing molecule would be α, α-bis(hydroxymethyl) propionic acid ammonium salt. The amount of water-dispersing group provided should be sufficient to disperse the prepolymer, typically in the range of isocyanate-to-dispersing group ratio of from about 4:1 to about 16:1, preferably at a proportion of from about 5:1 to about 11:1.

Illustrative dispersing compounds include but are not limited to those selected from the group consisting of:

${H_2N(CH_2)_nCH_2}_2NCH_3$ wherein n is an integer of 1 to 3;

$(HOCH_2)_2C(CH_3)COOH$;

${HO(CH_2)_nCH_2}_2NCH_3$ wherein n is an integer of 1 to 3;

$H_2N—C_2H_4—NH—C_2H_4—SO_3H$;

$H_2N—C_3H_6—N(CH_3)—C_3H_6—SO_3H$;

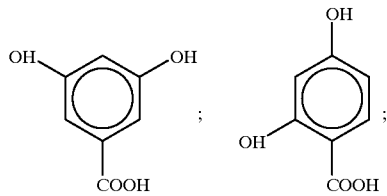

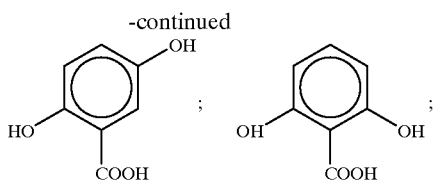

$HOCH_2—CH(OH)—CO_2Na$;
${(HOCH_2)_2CHCH_2—COO}^-{NH(CH_3)_3}^+$;

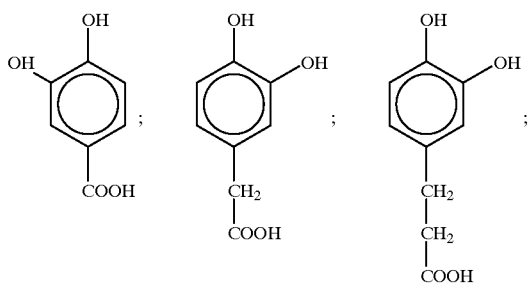

$CH_3(CH_2)_2CH(OH)—CH(OH)(CH_2)_3CO_2K$;
$(HOC_2H_4)_2N—C_3H_6—OSO_3Na$;
${H_2N—C_2H_4—NH—C_2H_4—N(CH_3)_3}^+Cl^-$;

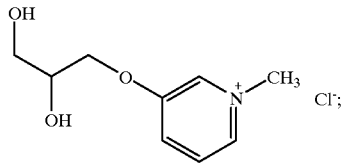

$(HOCH_2CH_2)_2NC_6H_4OCH_2CH_2OSO_2OH$;
${(H_2N)_2C_6H_3SO_3}^-{NH(C_2H_5)_3}^+$; and mixtures thereof.

As mentioned previously, the dispersion may be anionically, cationically, nonionically, or amphoterically stabilized.

Isocyanate-Reactive Silane Compounds

In addition to the isocyanate-terminated polyurethane prepolymer discussed supra, isocyanate-reactive silane compounds are useful in forming the dispersion of the invention. Silane compounds containing one, two, or three hydrolyzable groups on the silicon and one organic group including an isocyanate-reactive radical are most suitable for forming the terminal groups. As has been pointed out above any of the conventional hydrolyzable groups, such as those selected from the group consisting of alkoxy, acyloxy, amino, oxime, and the like, can be used. The alkoxy group is the most preferred hydrolyzable group and particularly preferred compounds are those of the structure $(R^3O)_3SiR^4—Z$, wherein $(R^3O)_3SiR^4—$ is a silyl moiety, $R^3$ is selected from the group consisting of hydrogen, lower alkyl radicals of one to four carbon atoms, preferably one or two (i.e., methoxy, ethoxy); lower acyl groups of about 2 to about 5 carbon atoms, preferably 2 or 3(i.e., acetyl or propionyl), and lower oxime groups of the formula $—N=CR^5R^6$, wherein $R^5$ and $R^6$ are monovalent lower alkyl groups comprising about 1 to about 12 carbon atoms, which can be the same or different, preferably selected from the group consisting of methyl, ethyl, propyl, and butyl; $R^4$ is a divalent organic bridging radical of about 2 to about 20 carbon atoms free from isocyanate reactive groups, preferably about 3 to about 10 carbon atoms, selected from the group consisting of divalent hydrocarbyl radicals free from olefinic unsaturation and free from isocyanate-reactive groups, and divalent polyoxyalkylene radicals containing not more than one ether oxygen per two carbon atoms; and Z is an isocyanate reactive group such as those selected from the group consisting of —OH, —SH, —NHR, —NH$_2$, —N(C$_2$H$_4$OH)$_2$, and other active hydrogen terminated compounds, wherein R is selected from the group consisting of phenyl, straight or branched aliphatic groups comprising from about 1 to about 12 carbon atoms, and cycloaliphatic groups.

Representative divalent alkylene radicals (i.e., R$^4$) include but are not limited to those selected from the group consisting of —CH$_2$CH$_2$—, —CH$_2$CH$_2$CH$_2$—, —CH$_2$CH$_2$CH$_2$OCH$_2$CH$_2$—, and —CH$_2$CH$_2$C$_6$H$_4$CH$_2$CH$_2$—. Other preferred compounds are those which contain one or two hydrolyzable groups, such as those having the structures

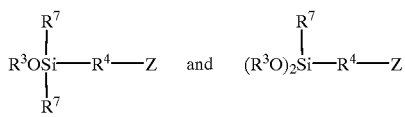

wherein R$^3$, R$^4$ and R$^7$ are as previously defined.

Following the hydrolysis of some of these terminal silyl groups, the polymers are curable by mutual inter-reaction to form siloxane linkages, e.g.,

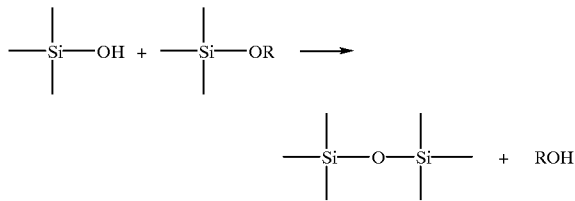

Such silicon compounds are well known in the art and many are commercially available or are readily prepared. Representative isocyanate-reactive silanes from which SIL may be derived include but are not limited to those selected from the group consisting of:

H$_2$NCH$_2$CH$_2$CH$_2$Si(OC$_2$H$_5$)$_3$;
H$_2$NCH$_2$CH$_2$CH$_2$Si(OCH$_3$)$_3$;

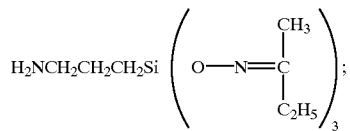

HSCH$_2$CH$_2$CH$_2$Si(OCH$_3$)$_3$;
HO(C$_2$H$_4$O)$_3$C$_2$H$_4$N(CH$_3$)(CH$_2$)$_3$Si(OC$_4$H$_9$)$_3$;
H$_2$NCH$_2$C$_6$H$_4$CH$_2$CH$_2$Si(OCH$_3$)$_3$;
HSCH$_2$CH$_2$CH$_2$Si(OCOCH$_3$)$_3$;
HN(CH$_3$)CH$_2$CH$_2$Si(OCH$_3$)$_3$;
HSCH$_2$CH$_2$CH$_2$SiCH$_3$(OCH$_3$)$_2$;
(H$_3$CO)$_3$SiCH$_2$CH$_2$CH$_2$NHCH$_2$CH$_2$CH$_2$Si(OCH$_3$)$_3$;
HN(CH$_3$)C$_3$H$_6$Si(OCH$_3$)$_3$;
HN{C$_3$H$_6$Si(OCH$_3$)$_3$}$_2$;
CH$_3$CH$_2$OOCCH$_2$CH(COOCH$_2$CH$_3$)HNC$_3$H$_6$Si(OCH$_2$CH$_3$)$_3$;

C$_6$H$_5$HNC$_3$H$_6$Si(OCH$_3$)$_3$;
H$_2$NC$_3$H$_6$SiCH$_3$(OCH$_2$CH$_3$)$_2$;
HOCH(CH$_3$)CH$_2$OOCNHC$_3$H$_6$Si(OCH$_2$CH$_3$)$_3$;
and mixtures thereof.

Salt-Forming Compounds

These dispersion of the invention may be anionically, nonionically, cationically or amphoterically stabilized. When acidic functional water-dispersing compounds are employed in the isocyanate-terminated prepolymer, basic salt-forming compounds, such as tertiary amines, inorganic bases including but not limited to those selected from the group consisting of sodium hydroxide, potassium hydroxide, cesium hydroxide, lithium hydroxide, calcium hydroxide, magnesium hydroxide, zinc hydroxide, and barium hydroxide may be used in a sufficient amount (i.e., in a quantity to maintain a pH of greater than about 8) preferably in the water phase, but optionally in the preparation of the prepolymer, to anionically stabilize the dispersions of the present invention through the formation of salts with the incorporated, pendant acidic water-solubilizing groups on the resultant polyurethane. Examples of useful salt-forming compounds include but are not limited to those selected from the group consisting of ammonia, trimethylamine, triethylamine, tripropylamine, triisopropylamine, tributylamine, triethanolamine, diethanolamine, morpholine, N-methylmorpholine, dimethylethanolamine, and mixtures thereof. Preferred salt forming compounds include those selected from the group consisting of ammonia, trimethylamine, triethylamine, tripropylamine, and triisopropylamine, since dispersions containing polyurethanes prepared therefrom are less hydrophilic upon coating and cure.

When straight chain aliphatic or aromatic compounds containing 2 or more isocyanate groups are used it is preferred to add the salt forming compound to the water phase. Certain salts formed by the reaction of salt forming compounds and water dispersing groups such as potassium hydroxide in combination with a carboxylic acid dispersing group could result in an undesired isocyanate reaction.

When basic functional water-dispersing compounds are employed in the isocyanate-terminated prepolymer, acid salt-forming , compounds, such as organic acids including but not limited to carboxylic acids like acetic acid, trifluoroacetic acid, benzoic acid, methanesulfonic acid, inorganic acids including but not limited to those selected from the group consisting of hydrochloric acid, sulfuric acid, sulfamic acid, phosphoric acid, and nitric acid, may be used in a sufficient amount (i.e., in a quantity to maintain a pH of less than about 5) preferably in the water phase but optionally in the preparation of the prepolymer, to cationically stabilize the dispersions of the present invention through the formation of salts with the incorporated, pendant basic water-solubilizing groups on the resultant polyurethane.

Chain Extenders

The term "chain extender" as used herein includes external chain extenders and blocked external chain extenders such as ketamines and oxazolines. The term chain extender as used refers to externally added chain extenders and excludes those generated in situ. Thus, the chain extension resulting from the reaction of the polyisocyanate compounds with the water of the water phase of the polyurethane dispersions is not denoted by this term and water is not considered an "external" chain extender. Chain extenders are employed to enhance the mechanical properties of the polyurethane of the present invention. Useful chain extenders for purposes of this invention which contain neither fluorine nor silicone usually have a number average molecular weight of about 249 or less. Useful chain extenders for the purposes of this invention which contain fluorine and/or silicone may have a molecular weight of 249 or less, but may alternatively have a number average molecular weight greater than 249. For example, polyols and polyamines which contain neither fluorine, nor silicone which are useful as chain extenders as the term is used herein are those usually having a number average molecular weight of about 249 or less. Chain extenders containing fluorine and/or silicone which are useful herein may have a number average molecular weight greater than 249. However, such fluorine and/or silicone containing difunctional chain extenders contain typically about 3–20 carbon (plus optional N atoms) in a chain between isocyanate reactive groups. The chain extender component must comprise a difunctional chain extender and may optionally comprise a chain extender having y a functionality of three or greater. Generally, due to the kinetics involved in the prepolymer and dispersion stages of the methods of the present invention, it is preferable to incorporate hydroxy functional chain extenders in the prepolymer and primary amine functional chain extenders in the water phase when preparing the silyl-terminated polyurethane dispersions. Through proper and judicious selection of reaction conditions, starting materials and additives known in the polyurethane art, such as blocked amines, catalysts, temperature, etc., reaction kinetics can be adapted to allow for the use of primary amines in the prepolymer reaction mixture and hydroxy functional chain extenders in the water phase.

Each CE moiety of formula (I) is optionally fluorinated and/or optionally contains silicone. Thus, depending on the formulation none, some or all of the CE moieties are fluorinated and/or contain silicone. For example, at least one CE moiety may be fluorinated. As another example at least one CE moiety may contain silicone.

The chain extender thus may contain fluorine and/or silicone. The chain extender component may, for example, be selected from the group consisting of fluorinated diols, fluorinated diamines, silicone diols, silicone diamines, and mixtures thereof. An example of a chain extender containing fluorine is

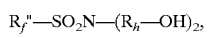

wherein $R_f''$ is a perfluoroalkyl group comprising 1 to 20 carbon atoms and each $R_h$ is independently an alkylene group comprising 2 to 20 carbon atoms.

A specific example of a chain extender containing fluorine is

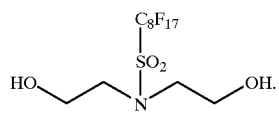

Another example of a chain extender containing fluorine is the novel fluorinated diol class

wherein $R_f$ and $R'_f$ are independently selected from perfluorinated alkyl groups of one to 20 carbon atoms optionally containing 1–6 ether oxygens or together form a perfluorinated 5–7 membered carbocyclic ring optionally substituted with perfluorinated alkyl groups comprising 1 to 4 carbon atoms, and R is lower alkyl of 1 to 4 carbon atoms. These chain extenders are useful because of their ease of synthesis, stability to hydrolysis, and reactivity toward isocyanates. The stability is evinced in the synthesis, involving acylation of a hydroxymethyl ketal and acid hydrolysis of the fluorinated ketal precursor. Since both OH groups are primary, reaction with diisocyanates and other acylating agents to form polymers is rapid. Preferred diols are those in which $R_f$ is selected from $C_nF_{2n+1}(O)_x$— wherein n=4 to 10 and x=0 or 1 and can optionally further comprise up to three catenary ether atoms; $R'_f$ is selected from the group consisting of —$CF_3$ and —$C_2F_5$; and R is methyl or ethyl.

The preferred synthetic route to the novel fluorinated diol is set forth below:

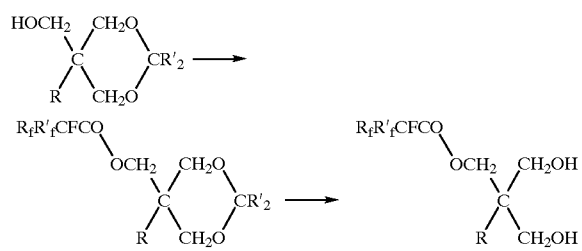

wherein R' is a $C_1$ to $C_4$ alkyl, preferably —$CH_3$ or —$C_2H_5$.

In a preferred embodiment of the novel fluorinated diol $R_f$ is a $C_4$ to $C_6$ fluoroalkyl;
$R_f$ is a $C_1$ to $C_3$ fluoroalkyl; and
R is a $C_1$ to $C_2$ alkyl.

An example of a useful chain extender component is

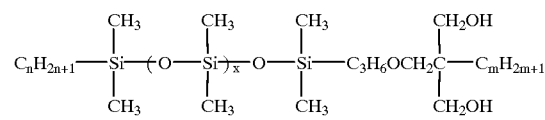

wherein x is an integer of 2 to 100, n is an integer of 1 to 20, and m is an integer of 1 to 20.

Another example of a suitable chain extender is

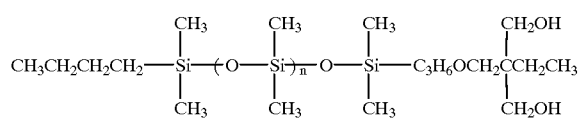

Examples of useful diol chain extenders include but are not limited to those selected from the group consisting of 1,4-butanediol, ethylene glycol, diethylene glycol, dipropylene glycol, neopentyl glycol, 1,6-hexanediol, 1,4-cyclohexane dimethanol, bis(2-hydroxylethyl)hydroquinone (HQEE), fluorinated and/or silicone containing derivatives of the aforementioned, and mixtures thereof.

Examples of useful diamine chain extenders include but are not limited to those selected from the group consisting of 4,4'-methylene bis(o-chloroaniline)(MOCA or MBOCA), 2,5-diethyl-2,4-toluene diamine (DETDA), 4,4'-methylene bis(3-chloro-2,6-diethylaniline)(MCDEA), propylene glycol bis(4,4'-aminobenzoate), 3,5-di(thiomethyl)-2,4-toluene diamine, methylene bis(4,4'-aniline)(MDA), ethyl-1,2-di(2-amino thiophenol), 4-chloro-3,5-diamino isobutylbenzoate, 1,2-diaminoethane, 1,4-diaminobutane, 1,6-diaminohexane, N,N'-dialkyl(methylene dianiline), N,N'-dialkyl(1,4-diaminobenzene), fluorinated and/or silicone containing derivatives of the aforementioned, and mixtures thereof.

The difunctional chain extender is preferably selected from the group consisting of 1,4-butanediol, ethylene glycol, diethylene glycol, dipropylene glycol, neopentyl glycol, 1,6-hexanediol, 1,4-cyclohexane dimethanol, bis(2-hydroxylethyl) hydroquinone, 4,4'-methylene bis(o-chloroaniline), 2,5-diethyl- 2,4-toluene diamine, 4,4'-methylene bis(3-chloro-2,6-diethylaniline), propylene glycol bis(4,4'-aminobenzoate), 3,5-di(thiomethyl)-2,4-toluene diamine, methylene bis(4,4'-aniline), ethyl-1,2-di(2-amino thiophenol), 4-chloro-3,5-diamino isobutylbenzoate, 1,2-diaminoethane, N,N'-dialkyl(methylene dianiline), N,N'-dialkyl(1,4-diaminobenzene), fluorinated and/or silicone containing versions of the aforementioned, and mixtures thereof.

Chain extenders and/or chain extender adducts having more than two isocyanate reactive functional groups, each functional group in the molecule having at least one active hydrogen (i.e., polyfunctional chain extenders) can be included in the polymer; however, difunctional chain extenders are required. Thus triols, tetrols, etc., can be used to introduce branching into the polyurethanes of the invention. These polyfunctional chain extenders are preferably low molecular weight and best utilized with short chain extenders such as 1,4-butanediol or the chain extenders as described infra. Small amounts of branching in the polyurethane backbone improve tensile strength and solvent resistance and decrease cold-flow of the final coatings prepared from the dispersions of the invention. On the other hand, excessive amounts of branching in the polyurethane of the dispersion may cause poor flow and thus less desirable film formation, freeze/thaw stability and processability. Examples of useful polyfunctional chain extenders include but are not limited to those selected from the group consisting of 1,2,6-hexanetriol, 1,1,1-trimethylolethane, 1,1,1-trimethylolpropane, pentaerythritol, triisopropanol amine, and triethanol amine.

Silane Compound Reactive With The Polymer Of Formula (I)

The dispersion and composition of the invention optionally further comprise a silane compound(s) reactive with the polymer of formula (I). This compound may optionally be fluorinated and/or optionally contain silicone.

An example of such a fluorinated silane is represented by the formula

$R_f^1(Z)_x C_g H_{2g} SiQ_3$ wherein Q is independently selected from a group consisting of acyloxy, alkoxy, Cl and OH;

$R_f^1$ is selected from the group consisting of fluorinated $C_1$ to $C_{14}$ alkyl groups;

Z is a divalent linking group selected from the group consisting of —$C_g H_{2g}$—, —$C_g H_{2g}O$— and —$SO_2N R^{11}$—; $R^{11}$ is an alkyl of $C_1$ to $C_6$;

x is 0 or 1;

g is an integer from 1 to 12, preferably 2.

Specific examples of such fluorinated silanes include $C_8F_{17}SO_2N(CH_2CH_3)CH_2CH_2CH_2Si(OCH_3)_3$ and $C_8F_{17}C_2H_4Si(OCH_3)_3$.

The present invention provides a film comprising a cured dispersion of the invention wherein at least one of the following is true:

(i) the polymer of formula (I) and the silane compound have a total combined fluorine content of about 5 to about 75% by weight, based upon the total weight of the polymer of formula (I) plus the silane compound;

(ii) the polymer of formula (I) and the silane compound have a total combined silicone content of about 10 to about 90% by weight, based upon the total weight of the polymer of formula (I) plus the silane compound;

(iii) the polymer of formula (I) and the silane compound have a total combined content of silicone plus fluorine ranging from about 10 to about 90% by weight based upon the total weight of the polymer of formula (I) plus the silane compound.

The present invention provides a film comprising a cured dispersion of the invention wherein at least one of the following is true:

(i) the polymer of formula (I) and the silane compound have a total combined fluorine content of about 10 to about 75% by weight, based upon the total weight of the polymer of formula (I) plus the silane compound;

(ii) the polymer of formula (I) and the silane compound have a total combined silicone content of about 15 to about 90% by weight, based upon the total weight of the polymer of formula (I) plus the silane compound;

(iii) the polymer of formula (I) and the silane compound have a total combined content of silicone plus fluorine ranging from about 20 to about 90% by weight, based upon the total weight of the polymer of formula (I) plus the silane compound.

The present invention provides a film comprising a cured dispersion of the invention wherein at least one of the following is true:

(i) the polymer of formula (I) and the silane compound have a total combined fluorine content of about 20 to about 75% by weight, based upon the total weight of the polymer of formula (I) plus the silane compound;

(ii) the polymer of formula (I) and the silane compound have a total combined silicone content of about 20 to about 90% by weight, based upon the total weight of the polymer of formula (I) plus the silane compound;

(iii) the polymer of formula (I) and the silane compound have a total combined content of silicone plus fluorine ranging from about 30 to about 90% by weight based upon the total weight of the polymer of formula (I) plus the silane compound.

The present invention provides a film comprising a cured dispersion of the invention wherein at least one of the following is true:

(i) the polymer of formula (I) and the silane compound have a total combined fluorine content of about 20 to about 75% by weight, based upon the total weight of the polymer of formula (I) plus the silane compound;

(ii) the polymer of formula (I) and the silane compound have a total combined silicone content of about 20 to about 80% by weight, based upon the total weight of the polymer of formula (I) plus the silane compound;

(iii) the polymer of formula (I) and the silane compound have a total combined content of silicone plus fluorine ranging , from about 30 to about 80% by weight, based upon the total weight of the polymer of formula (I) plus the silane compound.

Catalysts

The polyurethane prepolymer compositions of the present invention may be prepared without the use of a catalyst when the reaction is performed at a sufficient temperature (i.e., about 20° to about 100° C.) to cause the reaction between the polyisocyanate component and the active hydrogen containing compounds of the polyurethane prepolymer mixture. However, a catalyst may optionally be used according to the method of the invention. Depending on reaction conditions (e.g., reaction temperature and/or polyisocyanate used), a catalyst at the level of up to about 0.5 percent by weight of the isocyanate-terminated prepolymer typically about 0.00005 to about 0.5 percent by weight may be required to form the prepolymer by the methods of the present invention. Examples of useful catalysts include but are not limited to those selected from the group consisting of tin II and IV salts such as stannous octoate and dibutyltin dilaurate, respectively, tertiary amine compounds such as triethyl amine and bis(dimethylaminoethyl) ether, morpholine compounds such as β,β'-dimorpholinodiethyl ether, bismuth carboxylates, zinc-bismuth carboxylates, iron (III) chloride, potassium octoate, and potassium acetate. Examples of other useful catalysts can also be found in *Polyurethanes: Chemistry and Technology*, Part I, Table 30, Chapter 4, Saunders and Frisch, Interscience Publishers, New York, 1963.

Solvents

Although the polyurethanes of the present invention can be prepared without the use of solvents, solvents can be used to control the viscosity of the isocyanate-ter m ninated prepolymer. Examples of useful solvents (which are typically volatile or ganic compounds) added for this polyurethane purpose include but are not limited to those selected from the group consisting of ketones, tertiary alcohols, ethers, esters, amides, hydrocarbons, chlorohydrocarbons, chlorocarbons, and mixtures thereof. These solvents are typically non-reactive with isocyanates and are usually stripped at the end of the reaction by vacuum heating.

Solvents may also be required to promote the coalescence of the silyl-terminated polyurethane particles of the dispersion to form a continuous film. Examples of such coalescing solvents for use in the dispersion include but are not limited to those selected from the group consisting of n-methyl pyrrolidinone (NMP), n-butyl acetate, dimethyl formamide, toluene, methoxypropanol acetate (PM acetate), dimethyl sulfoxide (DMSO), ketones, alcohols, dimethyl acetamide, and mixtures thereof.

Method

The following is a typical method of making the dispersion of the invention. A polyurethane prepolymer is typically prepared in the first step of the process of making the silyl-terminated polyurethane dispersions of the present invention. To a reactor equipped with a stirrer, a heater, and a dry gas purge (for example, nitrogen, ar gon, etc.), the polyisocyanate component is added to the reactor with optional coalescing solvent and optional dry solvent (e.g., anhydrous methylethyl ketone, having $H_2O$ levels of 0.05% or less). The reactor is heated to the reaction temperature (generally from about 20° C. to about 100° C.) and the polyol component, optional catalyst, and the water solubilizing compound is added slowly, keeping the reaction exotherm below 100° C. to minimize unwanted side reactions. Optionally all or a portion of the chain extender component and the isocyanate reactive silane compound can be added at this point. If such optional compounds are included, then the isocyanate reactive functional groups on the chain extender and silane should not contain large amounts of a primary amine because there can be an unacceptable viscosity increase in the prepolymer which could make the dispersion step in water difficult. If the ratio of NCO:OH is less than 2:1, it may be desirable to prepare the hard segment (chain extender, water dispersing compound) followed by the soft segment (polyol).

As the polyurethane prepolymer is made, additional chain extender and polyisocyanate components can optionally be incorporated into the reaction mixture. In a preferred embodiment of the present method, a polyisocyanate adduct having greater than 2 two isocyanate groups can be added after about 80% of the polyisocyanate, polyol and optional chain extender components have converted to the prepolymer. The reaction is then allowed to proceed until the desired excess on an isocyanate equivalent basis of about 1.4 to about 4 times the combined active hydrogen equivalent as contributed by the polyol component, the water solubilizing compound, and optional chain extender component and isocyanate reactive silane compound is achieved.

Optionally the salt forming compound can be added to this polyurethane prepolymer reaction mixture. If the salt forming compound is added, care should be taken to reduce the temperature and/or disperse the polyurethane prepolymer in the water phase shortly after this addition. The product of the salt forming compound with the water-solubilizing compound can produce a salt which may in some cases catalyze an unwanted side reaction. This side reaction could result in an undesired viscosity increase making the dispersion step difficult. This rise in viscosity can be minimized or avoided by taking the precautions listed above. Optional solvent can be added at this point to modify the viscosity and/or enhance the processability of the polyurethane prepolymer. The viscosity of the prepolymer should be low enough (about 70,000 cps or less) to facilitate the dispersion step.

The second step is to typically make a water phase. The water phase typically comprises water, the salt forming compound, and all or the remainder of the chain extender component and the isocyanate reactive silane compound. Deionized water is used to prevent instability and agglomeration of the polyurethane prepolymer when it is subsequently dispersed into the water phase. Primary amine functional chain extenders and isocyanate reactive silane compounds are preferred in the water phase due to their relatively rapid reactivity with the isocyanate groups of the polyurethane prepolymer. If the final amount of the chain extender component, isocyanate reactive silane compound or salt forming compound has been added previously to the prepolymer, then they need not be added to the water phase. If partial additions of these components and compounds have occurred in the prepolymer, the remaining material may be added to the water phase, assuming compatibility with the water can be achieved, i.e., the components are either water soluble or water dispersible. The pH of the water phase is then measured to assure that the dispersion will be stable. An anionic dispersion is adjusted to achieve a pH of about 7 or higher, preferably a pH of about 8 or more.

The third step is to disperse the polyurethane prepolymer of the first step into the water phase of the second step. The water phase is added to the holding a tank of a homogenizer and sufficient air pressure is supplied to pump the water phase through the homo g aenizer's high shear rotor. The polyurethane prepolymer is slowly injected into the circulating water phase just prior to the high shear rotor. Care should be taken not to inject material too quickly. The dispersed material is then transferred back into the water phase holding tank. On the average two or three passes through the homogenizer typically yields a mean particle size in the range of about 0.06 to about 3.0 microns. However, particle size can vary with equipment, viscosity, presence of solvent temperature, etc. The particle size can be controlled by the viscosity of the first step. The higher the viscosity, generally the larger the particle size.

Introduction of solvents into the polyurethane prepolymer reaction mixture will have the result of lowering the particle size. If such an optional solvent was introduced, e.g., methyl ethyl ketone, the final step would be to strip off the unwanted solvent. This can be accomplished using a wiped film evaporator which applies heat and vacuum to a thin film of the material efficiently stripping off the solvent. Under laboratory conditions, a Haake Rotoevaporator or other similar equipment can be used to remove the solvent.

Optional Additives

One or more additives may optionally be added to the dispersion of the invention including but not limited to those selected from the group consisting of crosslinking agents, thixotropic agents, biocides, adhesion promoters such as silane adhesion promoters, corrosion inhibitors, pigments, colorants, photostabilizers, antioxidants, organic toxin antifoulin, agents, and inert low toxicity leachable, antifouling agents such as silicone fluid. Additives such as plasticizers may also be added to increase elasticity.

To further enhance the moisture resistivity of the formulated silane terminated polyurethane dispersions (or compositions) about 0 to about 5 percent by weight of a crosslinking agent, preferably about 2 to about 5 percent by weight, based upon the total weight of the dispersion (or composition), may be added. These crosslinkers improve water resistance by reacting with the carboxyl groups of the polymer of formula (I) of the invention. Use of polyfunctional aziridines or carbodiimides as crosslinking agents for waterborne urethanes is described by J. W. Rosthauser and K. Nachtkemp ("Waterborne Polyurethanes," *Advances in Urethane Science and Technoloy*-Vol. 10, ed. K. C. Frisch and D. Klempner, Technomics, 1987, p. 121–162), incorporated by reference herein. Waterborne epoxies and oxazolines also have been used as cross-linking agents for waterborne urethanes. These crosslinkers are added just prior to application of the coating y to the substrate, and have an associated pot life.

Antifouling agents may also be added to the dispersion (or composition) of the invention for applications where enhanced resistance to marine fouling a gents is desired. Examples of useful metallic antifoulin agents include, but are not limited to those selected from the group consisting of copper, cuprous oxide, organocopper compounds, organotin compounds, and organozinc compounds such as zinc-2-pyridinethiol-1-oxide (available as Zinc Omadine, from Olin Chemicals). Examples of useful or ganic antifoulin c , agents include, but are not limited to, those selected from the group consisting of 2,4,5,6-tetrachloroisophthalonitrile (Nopcocide N-96, from Henkel Corporation) and 4,5-dichloro-2-n-octyl-4-isothiazolin-3-one (Sea Nine 211, from Rohm and Haas Company).

Leachable additives, commonly used in silicone fouling release coatings such as silicone fluids, may also be added to enhance performance. These materials are relatively nontoxic, and function by slowly coming to the surface of the coating, creating a weak surface layer to which marine suitable fouling rganisms cannot adhere. These materials are typically based on polydimethylsiloxane. Other plasticizers or fluids that slowly leach to the surface may also be suitable. Leachable additives are discussed also in U.S. Pat. No. 5,298,060, incorporated by reference herein.

Other useful additives in the coating formulations (dispersions or coating s) of the present invention include but are not limited to defoaming agents such as Surfynol™ DF 110L (a high molecular weight acetylenic glycol nonionic surfactant available from Air Products & Chemicals, Inc.), SWS-211 (a polydimethylsiloxane aqueous emulsion, available from Wacker Silicone Corp.), and Dehydran™ 1620 (modified polyol/polysiloxane adducts available from Henkel Corp.); mar aids such as Byk™ 301, Byk™ 321 and Byk™ 341 (polyether modified polydisiloxane copolymers, all available from Byk Chemie); flow and leveling agents such as Igepal™ CO-630 (an ethoxylated nonylphenol nonionic surfactant available from Rhone-Poulenc Surfactant & Specialty Div.), Surfynol™ 104H (a nonionic surfactant comprising a solution of tetramethyl decynediol in ethylene glycol available from Air Products & Chemicals, Inc.), Surfynol™ 465 (an ethoxylated tetramethyl decynediol nonionic surfactant available from Air Products & Chemicals, Inc.), Fluorad™ FC-129 (a potassium fluorinated alkyl carboxylate anionic surfactant available from 3M Co.), Fluorad™ FC-171 (a fluorinated alkyl alkoxylate nonionic surfactant available from 3M Co.), Fluorad FC-430) (a fluorinated alkyl ester nonionic surfactant available from 3M Co.), and Rexol™ 25/9 (an alkyl phenol ethoxylate nonionic surfactant available from Hart Chemical Ltd.); coalescing solvents such as those described supra to assist in film formation; thickening agents such as the associative thickeners Acrysol™ ASE-60, Acrysol™ RM-825, Acrysol™ TT-935 and Acrysol™ 615, all available from Rohm and Haas Co.; and photostabilizers including but not limited to ultraviolet light (UV) stabilizers such as Tinuvin™ 144 (a hindered amine photostabilizer), Tinuvin™ 292 (a hindered amine photostabilizer) and Tinuvin™ 328 (an ultraviolet absorber), all commercially available from Ciba-Geigy Ltd. For dispersions or compositions of the present invention which are often subject to intense UV exposure (such as marine coatings), at least about 0.1 percent by weight of a photostabilizer such as ultraviolet light stabilizer can be used to inhibit and retard the yellowing and photodegradation of such formulations, typically about 0.1 to about 10 percent by weight, preferably about 1 to about 10 percent by weight, based upon the total weight of the dispersion or composition.

Dispersions or compositions of the present invention for use as UV stabilized coatings such as marine finishes can be formulated to retard or eliminate the effects of UV degradation by combining aliphatic isocyanates used as an isocyanate component such as isophorone and bis(cyclohexyl) diisocyanate, with UV stabilizers and antioxidants.

Coating , elasticity can be controlled by adjusting the isocyanate equivalent to active hydrogen equivalent ratio, chain extender content and the crosslink density of the cured film. The crosslink density can be controlled by adjusting such parameters as molecular weight per crosslink. Additives such plasticizers can also be used to modify elasticity.

Coating Composition

A coating composition of the invention comprises about 80 to about 99.9 percent by weight of the dispersion of the polymer of formula (I); about 0.1 to about 10 percent by weight of a photostabilizer; 0 to about 10 percent by weight of a surfactant; about 0.1 to about 10 percent by weight of a thickening agent; about 0.1 to about 10 percent by weight of a coalescing solvent; about 0.1 to about 20 percent by weight of a silane compound reactive with the polymer of formula (I); 0 to about 30) percent by weight of a lasticizer; 0 to about 20 percent by weight of a component selected from the group consisting of pigments, dyes, and mixtures thereof; 0 to about 5 percent by weight of a rosslinker; 0 to about 5 percent by weight of an antioxidant; 0 to about 10 percent by weight of an organic brocade; and 0 to about 20 percent of a non-toxic reachable inert silicone fluid antifouling agent; wherein the weight percentages are based upon the total weight of the coating composition and total 100%. This or other coating compositions comprising the dispersion of the invention can be coated by conventional methods such as spray, roll, brush, knife, curtain, etc. Coating drying time is temperature and thickness dependent but typically ranges from 10 minutes to 7 days, more typically 10 minutes or less for a 1 mil thick coating at 23° C.

The present invention also provides in one embodiment a film comprising the cured dispersion of the invention wherein at least one of the following is true:
  (i) the polymer of formula (I) has a fluorine content of about 5 to about 75% by weight, based upon the total weight of the polymer of formula (I);
  (ii) the polymer of formula (I) has a silicone content of about 10 to about 90% by weight, based upon the total weight of the polymer of formula (I);
  (iii) the polymer of formula (I) contains both silicone and fluorine, and the total content of silicone plus fluorine in the polymer of formula (I) ranges from about 10 to about 90%, based upon the total weight of the polymer of formula (I).

The present invention also provides in one embodiment a film comprising the cured dispersion of the invention wherein at least one of the following is true:
  (i) the polymer of formula (I) has a fluorine content of about 10 to about 75% by weight, based upon the total weight of the polymer of formula (I);
  (ii) the polymer of formula (I) has a silicone content of about 15 to about 90% by weight, based upon the total weight of the polymer of formula (I);
  (iii) the polymer of formula (I) contains both silicone and fluorine, and the total content of silicone plus fluorine in the polymer of formula (I) ranges from about 20 to about 90% by weight, based upon the total weight of the polymer of formula (I).

The present invention also provides in one embodiment a film comprising the cured dispersion of the invention wherein at least one of the following is true:
  (i) the polymer of formula (I) has a fluorine content of about 20 to about 75% by weight, based upon the total weight of the polymer of formula (I);
  (ii) the polymer of formula (I) has a silicone content of about 20 to about 90% by weight, based upon the total weight of the polymer of formula (I);
  (iii) the polymer of formula (I) contains both silicone and fluorine, and the total content of silicone plus fluorine in the polymer of formula (I) ranges from about 30 to about 90% by weight, based upon the total weight of the polymer of formula (I).

The present invention also provides in one embodiment a film comprising the cured dispersion of the invention wherein at least one of the following is true:
  (i) the polymer of formula (I) has a fluorine content of about 20 to about 75% by weight, based upon the total weight of the polymer of formula (I);
  (ii) the polymer of formula (I) has a silicone content of about 20 to about 80% by weight, based upon the total weight of the polymer of formula (I),
  (iii) the polymer of formula (I) contains both silicone and fluorine, and the total content of silicone plus fluorine in the polymer of formula (I) ranges from about 30 to about 80% by weight, based upon the total weight of the polymer of formula (I).

Test Methods

The following test methods were used herein.

Contact Angles

Contact angles were measured by dipping a glass slide in the subject coating and allowing the coating to dry seven days at 22 degrees C. and 50% relative humidity. The values were based on deionized water, as measured with an AST Products (9 Linnell Circle, Billerica, Mass. U.S.A. 01821) VCA 2500 Video Contact Angle System.

Surface Energy

These tests were run on the coated glass slide described above. Surface energies were calculated using the software provided with the VCA Video Contact Angle System (Geometric Mean Method). Reported values are the average of the surface energy calculated from the contact angles of the testing liquids water/formamide and water/methylene iodide pairs.

Combining the geometric-mean equation with Young's equation gives $$(1\cos\Theta_1)\gamma_1 = 2[(\gamma_1{}^d\gamma_s{}^d)^{1/2} + (\gamma_1{}^p\gamma_s{}^p)^{1/2}] \quad \text{equation 1}$$

$$(1+\cos\Theta_2)\gamma_2 = 2[(\gamma_2{}^d\gamma_s{}^d)^{1/2} + (\gamma_2{}^p\gamma_s{}^p)^{1/2}] \quad \text{equation 2}$$

where the superscripts 1 (water, for example) and 2 (formamide, for example) refer to the testing liquids 1 and 2, respectively. When two testing liquids of known surface tension, $\gamma$, and its components are used to measure the contact angle, $\Theta$, equation 1 and 2 can be solved simultaneously to give $\gamma_s{}^d$ and $\gamma_s{}^p$ of the solid. The terms $\gamma_s{}^d$ and $\gamma_s{}^p$ are the dispersion and polar components of solid surface tension (Polymer Interface and Adhesion, p. 181, Marcel Dekker Inc., 1982, incorporated by reference herein).

Immersion Weight Gain Test

An approximately 1.6 mm thick wet film of the coating was poured onto 3M™ 5491 PTFE Extruded Film Tape attached to an aluminum panel substrate. The coating was allowed to dry and cure for seven days at 22° C. and 50% relative humidity. The resulting dry film was approximately 0.4 mm thick. A portion of the film was cut out (approximately 2.5 cm×2.5 cm) and weighed ($w_1$) on an electronic balance capable of +/−0.001 gram accuracy. The specimen was then immersed in deionized water for seven days at 22° C. The specimen was then removed, patted dry with a paper towel, and quickly reweighed ($w_2$) before significant drying could take place. The % weight gain was calculated as follows:

$$\% \text{ gain} = (w_2 - w_1) \times 100 / w_1$$

It is preferred that the number of hydrophilic groups which may be present on the polymer be as low as possible in order that the water absorption be tow, but not so low that the polymer cannot be dispersed.

A film comprising the cured dispersion of the invention preferably has a water weight gain less than 15 percent when subjected to the immersion weight gain test, preferably less than 10 percent, and most preferably less than 5 percent.

Tensile and Elongation

Films were prepared as noted above under "Immersion Weight Gain Test". Testing was performed on a Sintech Model 6W tensile tester. Testino was performed according to a modification of American Society for Testing and Materials (ASTM) Test Method D412-87. Samples were prepared according to Method A (dumbbell and straight specimens). Dumbbell specimens approximately 0.318 cm (0.125 inch) in width and approximately 0.4 mm (0.016 inch) in thickness were tested at a crosshead speed of 5.08 cm/min (2 inches/min).

Preferably the tensile stren gth of a film of the present invention is at least about 7 MPa.

Preferably the elongation of a film of the present invention is greater than about 10 percent, more preferably at least about 100%.

| | |
|---|---|
| DES W | 4,4-cyclohexlmethyl diisocyanate commercially available from Bayer Coating Division under the tradename "Desmodur W" |
| DBTDL | Dibutyltin dilaurate |
| DMPA | 2,2-Bis(hydroxymethyl)propionic acid commercially available from Aldrich Chemical Company Milwaukee, Wisconsin. |
| DYNASYLAN 1110 | N-methyl-3-aminopropyltrimethoxysilane from Hüls America Inc., Piscataway, New Jersey. |
| EDA | ethylene diamine commercially available from Aldrich Chemical Company Milwaukee, Wisconsin. |
| Excess NCO | an excess on an isocyanate equivalent basis when compared to the combined active hydrogen equivalent of other components in the polyurethane prepolymer or dispersion |
| eq. | Equivalent |

3M™ 5491 PTFE Extruded Film Tape
  (polytetrafluoroethylene having a pressure sensitive adhesive coated thereon)

F-Diol-1 represented by the formula

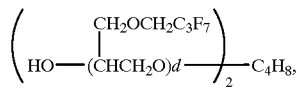

d is selected such that $M_N=2050$ as described in Example 23.

F-Diol-2 3M experimental diol, made by reacting perfluorosuccinyl fluoride with hexafluoropropylene oxide and subsequent reduction with sodium borohydride as described in U.S. Pat. No. 4,647,413 (assigned to the Minnesota Mining and Manufacturing, Company) incorporated by reference herein.

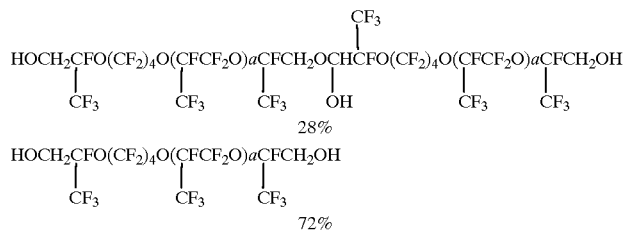

where a=approximately 1–10

F-SILANE 3M experimental silane, $C_8F_{17}SO_2N(CH_2CH_3)CH_2CH_2CH_2Si(OCH_3)_3$, prepared by addition of $HSiCl_3$ to the N-allyl sulfonamide and subsequent methanolysis as described in U.S. Pat. No. 5,274,159 (assigned to Minnesota, Mining and Manufacturing Company) incorporated by reference herein.

FL-IPDI Fluorinated Isocyanate Difunctional isocyanate polymer from Bayer which is composed of IPDI-monomer and the diallophanate of HDI, FC-10 (available from 3M Company), and IPDI. The average NCO equivalent weight is 148. This technology is covered by pending Bayer U.S. patent application serial numbers 08/764,891 and 08/767,056. The representative structure is

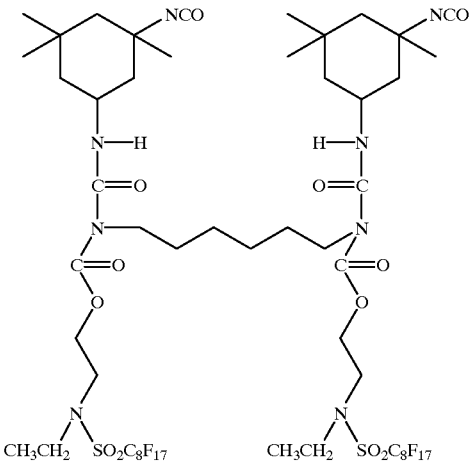

F-Diol-3

$HOCH_2CH_2CH_2CHR(OCHRCH_2CH_2CHR)_xOCHRCH_2CH_2CH_2OH$ wherein R is independently selected from the group consisting of —H and —$CF_2CFHCF_3$ such that 35.4 percent of the diol weight is fluorine and x is selected such that the molecular weight of the diol is 1360, experimental fluorochemical diol from ICI/Zeneca prepared from the reaction of polytetramethylene oxide diol (650 number average molecular weight) with hexafluoropropene, t-butyl peroxide and heating as described in U.S. Pat. No. 4,806,694, incorporated by reference herein.

IPDI Isophorone diisocyanate commercially available from Bayer Coatings Division, Pittsburgh, Pennsylvania, under the name "Desmodur I".

Jeffamine™ D230

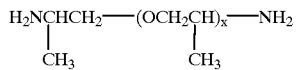

wherein x is 2–3 and the approximate molecular weight is 230, available from Huntsman Corporation, Houston, Tex.

Jeffamine™ XTJ-500 Water soluble polyoxyalkylene diamine from Huntsman Corporation, Houston, Tex. The amine equivalent weight is approximately 300 grams. The structure is,

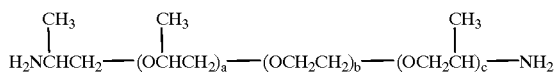

wherein b is 8.5, a+c is 2.5 and the approximate molecular weight is 600.

F-Diol-4 3M experimental diol, N,N-bis(2-hydroxyethyl) perfluorooctanesulfonamide. The structure is

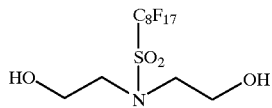

which can be prepared according to DE 2024909 and U.S. Pat. No. 3,734,962, both incorporated by reference herein, by alkylation of perfluorooctanesulfonamide with ethylene carbonate or chloroethanol.

F-Diol-5 Made by 3M by reduction of Ausimont Fomblin™ Z-Deal with NABH$_4$. Tg is −134° C. Hydroxyl equivalent weight of sample was 1380 grams. HOCH$_2$CF$_2$—(OCF$_2$CF$_2$)$_k$(OCF$_2$)$_j$CH$_2$OH wherein $$\frac{k}{j} = 0.8,$$

and the number average molecular weight is 2000.

MEK methyl ethyl ketone

NA Not available

NCO/OH molar ratio of isocyanate to hydroxy groups

NMP N-methyl-2-pyrrolidone commercially available from ISP Technologies, Inc. Wayne, N.J., Manufacturer of GAF Chemicals Poly-Fox Diols- Experimental diols obtained from Aerojet, Sacramento, Calif.

The structures for Poly-3 Fox and Poly-7 Fox

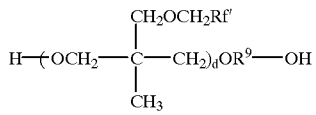

wherein

R$^9$ is selected from the group consisting of C$_2$ to C$_5$ alkylene and C$_2$ to C$_5$ isoalkylene; d is an integer from 2 to 250; and Rf' is —CF$_3$ for Poly-3 Fox and —C$_3$F$_7$ for Poly-7 Fox.

Poly-3 Fox had a hydroxyl equivalent weight of 2170 grams and Poly-7 Fox had a hydroxyl equivalent weight of 2330 grams or 266 3 grams.

Poly-7 Fox/THF copolymer is a copolymer of Poly-7 FOX with tetrahydrofuran (THF) having and OH equivalent weight of 2450 grams (29% THF by weight). The structure of the copolymer is

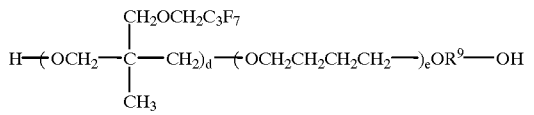

wherein

R$^9$ is selected from the group consisting of C$_2$ to C$_5$ alkylene and C$_2$ to C$_5$ isoalkylene; d is an integer from 2 to 250; e is an integer selected such that the weight fraction of —(OCH$_2$CH$_2$CH$_2$CH$_2$)— is 0 to about 70 weight percent of the diol.

All samples were obtained from Aerojet (Sacramento, Calif.).

These materials were made at 3M request.

F-Diol-6 Experimental diol from 3M prepared as in Example 22. The structure is:

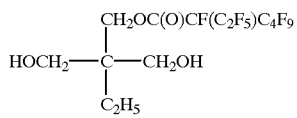

F-Diol-7 Experimental diol from 3M prepared as in Example 21. The structure is:

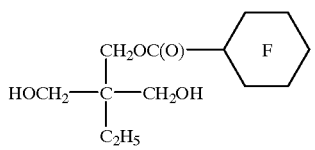

F-Diol-8 Experimental diol from 3M, wherein d is selected such that M$_N$=5500, as described in Example 23 . The structure is:

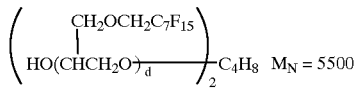

PTMEG polytetramethylene ether glycol under the name "PolyTHF", commercially available from BASF, Parsippany, N.J.

Q-Thane QZ-43 Crosslinker-Product of K. J. Quinn & Co., Inc. of Seabrook, N.H. It is a 50% by weight solution of a trifunctional aziridine crosslinker and N-methylpyrrolidone.

Silaplane FM-DA11 (Silicone Diol 1)-Polydimethylsiloxane, α, ω-bis {3-(2'-hydroxyethoxy)propyl}-Diol based on polydimethylsiloxane, from Chisso America Inc., New York, N.Y. The hydroxyl equivalent weight is approximately 650 grams. The structure is:

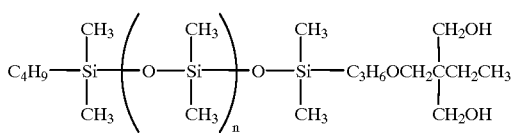

wherein n is 10 to 15.

Silaplane FM-4425 (Silicone Diol 2)-Silicone diol chain extender, from Chisso America Inc., New York, N.Y. The hydroxyl equivalent weight is approximately 5000 grams. The structure is,

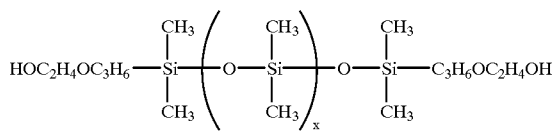

wherein x is 125 to 150.
Silicone Diols 3, 4, and 5

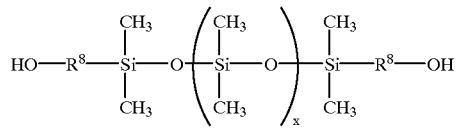

wherein the silicone polyether diol has two terminal hydroxy groups, wherein $R^8$ is an oxyalkylene group comprising butylene oxide units or propylene oxide units, x is 11 or 23. Tg is estimated to be $-80°$ C.

| Designation | x | Mn | % OH | $R^8$ |
|---|---|---|---|---|
| Silicone Diol 3 | 11 | 1399 g | 2.15 | bo[1] |
| Silicone Diol 4 | 23 | 1720 g | 1.51 | bo[1] |
| Silicone Diol 5 | 23 | 1560 g | 1.73 | po[2] |

[1]oxyalkylene group comprising butylene oxide units
[2]oxyalkylene group comprising propylene oxide units

| | |
|---|---|
| Silquest A-1100 | gamma-aminopropyltriethoxysilane from OSI Specialties Group, Witco Corporation of Tarrytown, New York. |
| Silquest A-1110 | gamma-aminopropyltrimethoxysilane from OSI Specialties Group, Witco Corporation of Tarrytown, New York. |
| TDI | toluene diisocyanate |
| TEA | triethylamine commercially available from Aldrich Chemical Company of Milwaukee, Wisconsin. |
| TMP | Trimethylolpropane from Hampshire Chemical Corp., of Lexington, Massachusetts. |

Percent of Fluorine and Silicone
 Calculations were based on the following percentages by weight:
 Fluorinated Components
  F-Diol-1: 32.8% F
  FL-IPDI: approximately 1.5% F
  F-Diol-2: 65.3% F
  F-Diol-3: 35.4% F
  F-Diol-5: approximately 60.2% F
  F-Diol-4: approximately 55.0% F
  F-Diol-6: 53.8% F
  Poly-7 Fox: approximately 46.2% F
  Poly-3 Fox: approximately 30.5% F
  Poly-7 Fox/THF: approximately 42.4%
  F-Silane 46.9% F
 Silicone Containing Components
  Silicone Diol 1:Silaplane FM-DA11, approximately 84.9% silicone (calculated)
  Silicone Diol 2:Silaplane FM-4425, approximately 97.9% silicone (calculated)
  Silicone Diol 3: approximately 22.7% Si, 59.9% silicone (calculated)
  Silicone Diol 4: approximately 28.4% Si, 75.0% silicone (calculated)
  Silicone Diol 5: approximately 29.1% Si, 76.7% silicone (calculated)
 The glossary can be referred to for more details.

EXAMPLES

The present invention is better illustrated by the following Examples, which are not meant to be limiting. All parts, percentages, etc., are by weight unless indicated otherwise.

Example 1

Dispersion Comprising Fluorinated Polymer of Formula (I) from F-Diol-4/PTMEG

A prepolymer was made in a reaction flask equipped with a heating mantle, condenser, stirring , blade, nitro gen inlet and thermometer equipped with a controller to monitor temperature. Desmodur W, 199.16 grams (1.509 equivalents); PTMEG, 46.70 grams (0.09 3 equivalents); F-Diol-4, 82.35 grams (0.280 equivalents); DMPA, 25.45 grams (0.379 equivalents); MEK, 89.12 grams and NMP, 62.41 rams were heated with stirring to 40–50° C. Next, DBTDL, 0.04 grams was added and the mixture was heated to 80° C. and allowed to react for two hours.

A premixture was made with 561 grams of distilled water, 14.48 grams of TEA, 14.61 grams (0.486 equivalents) of EDA and 14.61 grams (0.0815 equivalents) of Silquest A-1110.

The prepolymer, 381 grams (0.570 equivalents) was added over 10 minutes to the premixture in a Microfluidics Homogenizer Model #HC-5000 at an air line pressure 0.621 MPa. A stable dispersion was formed. A portion of the dispersion was cast and cured for one week at 21° C. and 50% relative humidity. Test specimens of the cured film were prepared according to the requirements of each test method and tensile strength and % elongation were determined. These data are presented in Table 1.

Example 2

Dispersion Comprising Fluorinated Polymer of Formula (I) from F-Diol-4/PTMEG

A prepolymer was made in a reaction flask equipped with a heating mantle, condenser, stirring blade, nitrigen inlet and thermometer equipped with a controller to monitor temperature. DES W, 187.31 g rams (1.419 equivalents); PTMEG, 87.85 grams (0.176 equivalents); F-Diol-4, 51.63 grams (0.176 equivalents); DMPA, 23.94 grams (0.357 equivalents); MEK, 111.9 grams and NMP, 78.3 grams were heated with stirring to 40–50° C. Next, DBTDL, 0.06 grams was added and the mixture was heated to 80° C. and allowed to react for two hours.

A premixture was made with 528 grams of distilled water, 12.98 grams of TEA, 13.1 grams (0.436 equivalents) of ethylene diamine and 13.1 grams (0.0731 equivalents) of Silquest A-1110.

The prepolymer, 360.2 grams (0.511 equivalents) was added over 10 minutes to the premixture in a Microfluidics Homogenizer Model #HC-5000 at an air line pressure 0.621 MPa. A stable dispersion was formed. A portion of the dispersion was cast and cured for one week at 21° C. and 50% relative humidity. Test specimens of the cured film were prepared according to the requirements of each test method and tensile strength and % elongation were determined. These data are presented in Table 1.

Example 3

Dispersion Comprising y Fluorinated Polymer of Formula (I) from F-Diol-4/F-Diol-2 Mixture

A prepolymer was made in a reaction flask equipped with a heating mantle, condenser, stirring blade, nitrogen inlet and thermometer equipped with a controller to monitor temperature. IPDI, 143.68 grams (1.293 equivalents); F-Diol-2 mixture, 101.28 grams (0.160 equivalents); F-Diol-4,47.05 grams (0.160 equivalents); DMPA, 21.82 grams (0.325 equivalents); MEK, 79.13 grams and NMP, 55. 3)7 grams were heated with stirring to 40–50° C. DBTDL, 0.08 grams was added and the mixture was heated to 80° C. and allowed to react for two hours.

A premixture was made with 289 grams of distilled water, 7.24 grams of TEA, 7.31 g rams (0.243 equivalents) of EDA and 7.31 grams (0.0408 equivalents) of Silquest A-1110.

The prepolymer, 197.3 grams (0.285 equivalents) was added over 10 minutes to the premix in a Microfluidics Homogenizer Model #HC-5000 at an air line pressure 0.621 MPa. A stable dispersion was formed. A portion of the dispersion was cast and cured for one week at 21° C. and 50% relative humidity. Test specimens of the cured film were prepared according to the requirements of each test method and tensile stren gth and % elongation were determined. These data are presented in Table 1.

Example 4

Dispersion Comprising Fluorinated Polymer of Formula (I) from F-Diol-4/Poly 7 Fox

A prepolymer was made in a reaction flask equipped with a heating mantle, condenser, stirring blade, nitrogen inlet and thermometer equipped with a controller to monitor temperature. IPDI, 16.86 grams (0.152 equivalents); Poly 7 Fox, 79.67 grams (0.019 equivalents); F-Diol-4, 5.57 grams (0.019 equivalents); DMPA , 2.54 grams (0.038 equivalents); MEK, 26.37 grams and NMP, 18.47 grams were heated with stirring to 40–50° C. DBTDL, 0.04 grams was added and the mixture was heated to 80° C. and allowed to react for two hours.

A premixture was made with 206 grams of distilled water, 1.91 grams of TEA, 1.94 grams (0.065 equivalents) of EDA and 2.40 grams (0.0108 equivalents) of Silquest A-1100.

The prepolymer, 148.9 grams (0.076 equivalents) was added over 10 minutes to the premixture in a Microfluidics Homo genizer Model #HC-5000 at an air line pressure 0.621 MPa. A stable dispersion was formed. A portion of the dispersion was cast and cured for one week at 21° C. and 50% relative humidity. Test specimens of the cured film were prepared according to the requirements of each test method and tensile stren gth and % elongation were determined. These data are presented in Table 1.

Comparative Example 5

Dispersion Comprising Fluorinated POL-Free Polymer formed from F-Diol-4

Diol A was made in a reaction flask equipped with a heating mantle, condenser, stirring blade, nitro en inlet and thermometer equipped with a controller to monitor temperature. DES W, 69.30 g Orams (0.525 equivalents); F-Diol-4, 205.52 grams (0.700 equivalents); MEK, 95.80 grams and NMP, 67.03 grams were heated with stirring to 40–50° C. DBTDL, 0.28 grams was added and the mixture was heated to 70° C. and allowed to react for 18 hours.

A prepolymer was made in a reaction flask equipped with a heating mantle, condenser, stirring , blade, nitrogen inlet and thermometer equipped with a controller to monitor temperature. DES W, 237.10 grams (1.796 equivalents); Diol A, 1113.39 grams (0.445 equivalents), and DMPA, 30.30 grams (0.452 equivalents) were heated with stirring to 40–50° C. DBTDL, 0.12 grams was added and the mixture was heated to 80° C. and allowed to react for two hours. The prepolymer was too viscous to disperse. We believe that this was due to the lack of a POL se gment in the polymer.

Comparative Example 6

Dispersion Comprising Fluorinated POL-Free Polymer formed from F-Diol-4

Diol B was made in a reaction flask equipped with a heating mantle, condenser, stirring blade, nitrogen inlet and thermometer equipped with a controller to monitor temperature. DES W, 36.98 grams (0.280 equivalents); F-Diol-4, 164.50 grams (0.560 equivalents), MEK, 93.20 grams and NMP, 65.26 grams were heated with stirring to 40–50° C. DBTDL, 0.20 grams was added and the mixture was heated to 70° C. and allowed to react for 18 hours.

A prepolymer was made in a reaction flask equipped with a heating mantle, condenser, stirring , blade, nitrogen inlet and thermometer equipped with a controller to monitor temperature. DES W, 237.10grams (1.796 equivalents); Diol B, 572.09 grams (0.445 equivalents); DMPA, 30.30 grams (0.452 equivalents) were heated with stirring to 40–50° C. DBTDL, 0.07 grams was added and the mixture was heated to 80° C. and allowed to react for two hours.

A premixture was made with 594 grams of distilled water, 11.29 grams of TEA, 11.29 grams (0.376 equivalents) of EDA and 11.29 grams (0.063 equivalents) of Silquest A-1110.

The prepolymer, 414.8 grams (0.444 equivalents) was added over 10 minutes to the mixture in a Microfluidics Homo genizer Model #HC-5000 at an air line pressure 621 MPa. A precipitate was obtained. Resin precipitated during the dispersion step. We believe that this was due to the lack of a POL segment in the polymer.

TABLE 1

Physical Properties of Dispersions of Examples 1–4 Comprising Fluorinated Polymers of Formula (I) and Comparative Example 5–6

| Example # | Tensile Strength (MPa) | % Elongation | % Fluorine (solids) |
|---|---|---|---|
| 1 | 10.5 | 102 | 11.9 |
| 2 | 22.0 | 133 | 7.5 |
| 3 | Too brittle to test | NA | 26.9 |
| 4 | Too brittle to test | NA | NA |
| Comparative 5 | Prepolymer too viscous to disperse | NA | NA |
| Comparative 6 | Resin precipitated during dispersion step | NA | NA |

Example 7

Dispersion Comprising Fluorinated Polymer of Formula (I) from F-Diol-5/F-Diol-4

A prepolymer was made in a 1 liter reaction flask equipped with a heating mantle, condenser, stirring blade, nitrigen inlet and thermometer equipped with a temperature controller. FL-IPDI, 69.59 grams (0.4735 eq.); F-Diol-5, 128.24 grams (0.1264 eq.); F-Diol-4, 9.35 grams (0.0318 eq.); DMPA, 5.32 grams (0.0792 eq.) and NMP, 37.5 grams were heated with stirring to 40 to 50° C. Next, 0.081 grams of DBTDL was added and the mixture was heated to 80° C. and allowed to react for 4 to 6 hours.

A premixture was made with 421.92 grams of distilled water, 6.0 grams of TEA, 4.23 grams (0.1407 eq.) of EDA and 3.36 grams (0.0176 eq.) of DYNASYLAN 1110.

The prepolymer, 170.15 grams (0.1608 eq.) was added over 10 minutes to the premixture in a Microfluidics Homogenizer Model #HC-8000 at an air line pressure of 0.621 Mpa. A stable dispersion was formed.

Example 8

Dispersion Comprising Fluorinated Polymer of Formula (I) from Silicone Diol 3/F-Diol-4

A prepolymer was made in a 1 liter reaction flask equipped with a heating mantle, condenser, stirring blade, nitrogen inlet and thermometer equipped with a temperature controller. FL-IPDI, 76.45 grams (0.5201 eq.); Silicone Diol 3, 119.91 grams (0.137 eq.); F-Diol-4, 10.3 grams (0.0351 eq.); DMPA, 5.84 grams (0.087 eq and NMP, 37.5 grams were heated with stirring to 40–50° C. Next, 0.081 grams of DBTDL was added and the mixture was heated to 80° C. and allowed to react for 4–6 hours.

A premixture was made with 323.08 grams of distilled water, 4.44 grams of TEA, 4.67 grams (0.1553 eq.) of EDA and 3.71 grams (0.0194 eq.) of DYNASYLAN 1110.

The prepolymer, 170.15 grams (0.1778 eq.) was added over 10 minutes to the premixture solution in a Microfluidics Homogenizer Model #HC-8000 at an air line pressure of 0.621 Mpa. A stable dispersion was formed.

Example 9

Dispersion Comprising Fluorinated Polymer of Formula (I) from FL-IPDI

A prepolymer was made in a 1 liter reaction flask equipped with a heating mantle, condenser, stirring blade, nitrogen inlet and thermometer equipped with a temperature controller. FL-IPDI, 80.11 grams (0.5451 eq.); Silicone Diol 4,124.56 grams (0.1448 eq.); TMP, 1.7 grams (0.0381 eq.); DMPA, 6.12 grams (0.0912 eq.) and NMP, 37.5 grams were heated with stirring to 40–50° C. Next, 0.081 grams of DBTDL was added and the mixture was heated to 80° C. and allowed to react for 4–6 hours.

A premixture was made with 323.38 grams of distilled water, 4.65 grams of TEA, 4.83 grams (16.9 eq.) of EDA and 3.84 grams (0.0201 eq.) of DYNASYLAN 1110.

The prepolymer, 170.15 grams (0.184 eq.) was added over 10 minutes to the premixture in a Microfluidics Homo genizer Model #HC-8000 at an air line pressure of 0.621 Mpa. A stable dispersion was formed.

Example 10

Dispersion Comprising Fluorinated Polymer of Formula (I) from Poly 7 FOX/F-Diol-4

A prepolymer was made in a 1 liter reaction flask equipped with a heating mantle, condenser, stirring blade, nitrigen inlet and thermometer equipped with a temperature controller. FL-IPDI, 61.91 grams (0.4212 eq.); Poly 7 Fox, 127.97 grams (0.0525 eq.); F-Diol-4, 15.49 grams (0.0528 eq.); DMPA, 7.08 grams (0.1055 eq.) and NMP, 37.5 grams were heated with stirring to 40–50° C. Next, 0.081 grams of DBTDL was added and the mixture was heated to 80° C. and allowed to react for 4–6 hours.

A premixture was made with 416.67 grams of distilled water, 6.0 grams of TEA, 3.75 grams (0.1248 eq.) of EDA and 2.98 grams (0.0156 eq.) of DYNASYLAN 1110.

The prepolymer, 170.15 grams (0.1434 eq.) was added over 10 minutes to the premixture in a Microfluidics Homogenizer Model #HC-8000 at an air line pressure of 0.621 MPa. A stable dispersion was formed.

Example 11

Dispersion Comprising Fluorinated Polymer of Formula (I) from Poly 3 FOX/F-Diol-4

A prepolymer was made in a 1 liter reaction flask equipped with a heating mantle, condenser, stirring blade, nitrogen inlet and thermometer equipped with a temperature controller. FL-IPDI, 63.71 grams (0.4335 eq.); Poly 3 Fox, 125.73 grams (0.0538 eq.); F-Diol-4, 15.71 grams (0.0535 eq.); DMPA, 7.29 grams (0.1086 eq.) and NMP, 37.5 grams were heated with stirring to 40–50° C. Next, 0.081 grams of DBTDL was added and the mixture was heated to 80° C. and allowed to react for 4–6 hours.

A premix was made with 416.69 grams of distilled water, 6.0 grams TEA, 3.87 grams (0.1289 eq.) of EDA and 3.08 grams (0.0161 eq.) of DYNASYLAN 1110.

The prepolymer, 170.15 grams (0.1483 eq.) was added over 10 minutes to the premix solution in a Microfluidics Homo genizer Model #HC-8000 at an air line pressure of 0.621 MPa. A stable dispersion was formed.

Example 12

Dispersion Comprising Fluorinated Polymer of Formula (I) from F-Diol-4/F-Diol-5/F-Silane A prepolymer was made in a 1 liter reaction flask equipped with a heating mantle, condenser, stirring blade, nitrogen inlet and thermometer equipped with a temperature controller. IPDI, 46.25 grams (0.4161 eq.); F-Diol-5, 153.31 grams (0.1111 eq.); F-Diol-4, 8.21 grams (0.0280 eq.); DMPA, 4.67 grams (0.0696 eq.); and NMP, 37.5 grams were heated with stirring to 40–50° C. Next, 0.081 grams of DBTDL was added and the mixture was heated to 80° C. and allowed to react for 4–6 hours. Before the prepolymer was removed from the flask, 2.5% (6.25 grams) of F-Silane was added to the flask and the flask contents were mixed for 10 minutes.

A premixture was made with 420.26 grams of distilled water, 6.0 grams of TEA, 3.71 grams (0.1236 eq.) of EDA and 2.95 grams (0.0154 eq.) of DYNASYLAN 1110.

The prepolymer, 170.15 grams (0.141 eq.) was added over 10 minutes to the premixture in a Microfluidics Homogenizer Model #HC-8000 at an air line pressure of 0.621 MPa. A stable dispersion was formed.

Example 13

Dispersion Comprising Fluorinated Polymer of Formula (I) from F-Diol-5/F-Diol-4

A prepolymer was made in a 1 liter reaction flask equipped with a heating mantle, condenser, stirring blade, nitrogen inlet and thermometer equipped with a temperature controller. IPDI, 51.6 grams (0.4642 eq.); F-Diol-5, 146.32 grams (0.1060 eq.); F-Diol-4, 7.84 grams (0.0267 eq.); DMPA, 6.69 grams (0.0997 eq.) and NMP, 37.5 grams were heated with stirring to 40–50° C. Next, 0.081 grams of DBTDL was added and the mixture was heated to 80° C. and allowed to react for 4–6 hours.

A premixture was made with 419.05 grams of distilled water, 5.08 grams of TEA, 4.13 grams (0.1373 eq.) of EDA and 3.28 grams (0.0172 eq.) of DYNASYLAN 1110.

The prepolymer, 170.15 grams (0.1576 eq.) was added over 10 minutes to the premixture in a Microfluidics Homogenizer Model #HC-8000 at an air line pressure of 0.621 Mpa. A stable dispersion was formed.

Example 14

Dispersion Comprising Fluorinated Polymer of Formula (I) from F-Diol-5/F-Diol-4/Siticone Diol 5

A prepolymer was made in a 1 liter reaction flask equipped with a heating mantle, condenser, stirring blade, nitrigen inlet and thermometer equipped with a temperature controller. IPDI, 60.66 grams (0.5457 eq.); F-Diol-5, 86.07 grams (0.0624 eq.); Silicone Diol 5, 48.64 grams (0.0624 eq.); F-Diol-4, 9.22 grams (0.0314 eq.); DMPA, 7.86 grams (0.1172 eq.) and NMP, 37.5 grams were heated with stirring to 40–50° C. Next, 0.081 grams of DBTDL was added and the mixture was heated to 80° C. and allowed to react for 4–6 hours.

Apremixture was made with 420.92 grams of distilled water, 5.97 grams of TEA, 4.84 grams (0.1611 eq.) of EDA and 3.85 grams (0.0201 eq.) of DYNASYLAN 1110.

The prepolymer, 170.15 grams (0.1855 eq.) was added over 10 minutes to the premixture in a Microfluidics Homogenizer Model #HC-8000 at an air line pressure of 0.621 Mpa. A stable dispersion was formed.

Example 15

Dispersion Comprising Fluorinated Polymer of Formula (I) from F-Diol-5/F-Diol-4 and a Crosslinker.

The dispersion of Example 13, 95 grams was mixed for 5 minutes on an air driven stirrer with 5 grams of Q-Thane QZ43 Crosslinker.

Example 16

Dispersion Comprising Fluorinated Polymer of Formula (I) from Poly 7 FOX

A prepolymer was made in a 1 liter reaction flask equipped with a heating mantle, condenser, stirring blade, nitrogen inlet and thermometer equipped with a temperature controller. Poly 7 Fox, 142.28 grams (0.0611 eq.); IPDI, 13.59 grams (0.1222 eq.) and 33.75 grams of NMP were heated with stirring to 40–50° C. Next, DBTDL, (0.081 grams) was added and the mixture was heated to 80° C. and allowed to react for 2 hours. DMPA (8.2 grams and 0.1221 eq.) was added and allowed to react for 2 hours at 80° C. IPDI (27.15 grams and 0.2442 eq.) was added and allowed to react for 2 hours at 80° C. Prepolymer was heated in a 50° C. oven to further react overnight.

A premixture was made with 412.18 grams of distilled water, 6.0 grams of TEA, 3.6 grams (0.1198 eq.) of EDA and 2.86 grams (0.0150 eq.) of DYNASYLAN 1110.

The prepolymer, 170.15 grams (0.1386 eq.) was added over 10 minutes to the premixture in a Microfluidics Homogenizer Model #HC-8000 at an air line pressure of 0.621 Mpa. A stable dispersion was formed.

Example 17

Dispersion Comprising Fluorinated/Silicone Polymer of Formula (I) from Poly 7 FOX/Silicone Diol 1

A prepolymer was made in a 1 liter reaction flask equipped with a heating mantle, condenser, stirring blade, nitrigen inlet and thermometer equipped with a temperature controller. FL-IPDI, 90.33 grams (0.6149 eq.), Poly 7 FOX/THF copolymer, 139.62 grams (0.0554 eq.), Silicone Diol 1, 9.00 grams (0.0138 g eq.), DMPA, 15.98 grams (0.2382 eq.), and NMP, 45.00 grams, and were heated with stirring to 50–60° C. Next, 0.07 grams of DBTDL was added and the mixture was heated to 80° C. and allowed to react for 6 hours.

A premixture was made with 328.14 grams of distilled water, 6.0 grams of TEA, 4.70 grams (0.1566 eq.) of EDA, and 3.74 grams (0.0196 eq.) of DYNASYLAN 1110.

The prepolymer, 179.0 grams (0.1834 eq.), was added over 10 minutes to the premixture in a Microfluidics Homogenizer #HC-8000 at an air line pressure of 0.621 Mpa. A stable dispersion was formed.

Example 18

Dispersion Comprising Silicone Polymer of Formula (I) from Silicone Diol 2

A prepolymer was made in a 1 liter reaction flask equipped with a heating mantle, condenser, stirring blade, nitrigen inlet and thermometer equipped with a temperature controller. FL-IPDI, 54.40 grams (0.3703 eq.), Silicone Diol 2, 190.89 grams (0.0382 eq.), TMP, 0.43 grams (0.0095 eq.), DMPA, 9.22 grams (0.1374 eq.), and NMP, 45.00 grams, were heated with stirring to 50–60° C. Next, 0.07 grams of DBTDL, was added and the mixture was heated to 80° C. and allowed to react for 6 hours.

A premixture was made with 454.87 grams of distilled water, 6.0 grams of TEA, 25.71 grams (0.0857 eq.) of Jeffamine XTJ500, and 2.05 grams (0.0107 eq.) of DYNASYLAN 1110.

The prepolymer, 160.0 grams (0.0988 eq.), was added over 10 minutes to the premixture in a Microfluidics Homogenizer #HC-8000 at an air line pressure of 0.621 Mpa. A stable dispersion was formed.

Example 19

Dispersion Comprising Fluorinated Polymer of Formula (I) from F-Diol-1

A prepolymer was made in a 1 liter reaction flask equipped with a heating mantle, condenser, stirring blade, nitrigen inlet and thermometer equipped with a temperature controller. FL-IPDI, 84.14 grams (0.5728 eq.), F-Diol- 1, 117.41 grams (0.1146 eq.), TMP, 1.29 grams (0.0286 eq.), DMPA, 9.61 grams (0.1432 eq.), and NMP, 37.50 grams, were heated with stirring to 50–60° C. Next, 0.06 grams of DBTDL was added and the mixture was heated to 80° C. and allowed to react for 6 hours.

A premixture was made with 464.19 grams of distilled water, 6.0 grams of TEA, 20.18 grams (0.1682 eq.) of Jeffamine D230, and 4.01 grams (0.0210 eq.) of DYNASYLAN 1110.

The prepolymer, 170 grams (0.1947 eq.), was added over 10 minutes to the premixture in a Microfluidics Homogenizer #HC-8000 at an air line pressure of 0.621 Mpa. A stable dispersion was formed.

Example 20

Dispersion Comprising Fluorinated Polymer of Formula (I) from F-Diol-3

A prepolymer was made in a 1 liter reaction flask equipped with a heating mantle, condenser, stirring blade, nitrigen inlet, and thermometer equipped with a temperature controller. FL-IPDI, 124.04 grams (0.8444 eq.), F-Diol-3, 114.84 grams (0.1689 eq.), TMP, 1.90 grams (0.0422 eq.), DMPA, 14.16 grams (0.2111 eq.), and NMP, 45.00 grams, were heated with stirring to 50–60° C. Next, 0.07 grams of DBTDL was added and the mixture was heated to 80° C. and allowed to react for 6 hours.

A premixture was made with 504.64 grams of distilled water, 6.0 grams of TEA, 26.08 grams (0.2174 eq.) of Jeffamine D230, and 5.19 grams (0.0272 eq.) of DYNASYLAN 1110.

The prepolymer, 180 grams (0.2533 eq.) was added over 10 minutes to the premixture in a Microfluidics Homogenizer #HC-8000 at an air line pressure of 0.621 Mpa. A stable dispersion was formed.

Examples 7A–20A

Preparation of Coatings from the Dispersions of Examples 7–20 and Testing Thereof The dispersions prepared according to Examples 7 through 20 were each separately coated on a substrate. An approximately 1.6 mm thick wet film of the coating was poured onto 3M™ 5491 PTFE Extruded Film Tape attached to an aluminum panel substrate. The coating was allowed to dry and cure for seven days at 22° C. and 50% relative humidity. The resulting dry film was approximately 0.4 mm thick.

The resulting coated sample was designated as corresponding A samples. Contact angle, surface energy, tensile stren gth and elongation was measured for each coating. Water resistance was determined by immersion weight gain test. Results are shown in Table 2.

Example 21

Preparation of 2,2-Bis(hydroxymethyl)butyl perfluorocyclohexanecarboxylate (F-Diol-7)

A mixture of 88.0 g 2,5-diethyl-5-hydroxymethyl-2 methyl-1,3-dioxane (from tris(hydroxymethyl)propane and 2-butanone by azeotropic distillation of water formed under catalysis by p-toluenesulfonic acid, distilled at 110° C./160 Pascal), 60 g triethylamine, and 250 ml dichloromethane was chilled in ice and treated with 240 g of 70% cyclo-$C_6F_{11}COF$, made by electrochemical fluorination of benzoyl chloride. This acid fluoride comprised about 70% weight 6-membered ring and 30% weight 5-membered ring, hereafter referred to as "F-cyclohexanecarbonyl." After one hour the mixture was washed with water and the product was distilled to 205 g cloudy liquid, boiling point 105–110° C./40 Pascal.

This was dissolved in 100 ml methanol containing 40 ml 10% weight HCl and stirred 1.5 hr at 23° C. (5% weight conversion by gas-liquid chromatography, hereafter "GLC") and then heated at 56° C. for 3 hours. GLC then showed only 9% weight ketal. The mixture was quenched in water and the precipitated oil was reheated with fresh methanol and 40 g 5% weight HCl for 3 hours. The product was precipitated again with water, washed well with water, and stripped to 153.8 g pale yellow liquid, which solidified on cooling (melting range 45–53° C.).

Example 22

Preparation of 2,2-Bis(hydroxymethyl)butyl perfluoro-2-ethylhexanoate (F-Diol-6)

In a similar fashion as immediately described above, perfluoro-2-ethylhexanoyl fluoride was converted to the title diol as a yellow oil.

Example 23

Preparation of F-Diol-8 and F-Diol-1

1,1 -Dihydroperfluoroalkyl glycidyl ethers were prepared and polymerized by a variation on the methods described in U.S. Pat. No. 4,508,916, incorporated by reference herein. 1,1-Dihydroperfluoroalcohols were reacted with NAOH and excess epichlorohydrin in the presence of Adogen™ 464 quaternary ammonium phase transfer catalyst (available from Aldrich Chemical Co.) in THF and the resulting glycidyl ethers were purified by distillation. A 4 oz.(125 ml) bottle was charged with 100 g 1,1 -dihydroperfluorooctyl glycidyl ether, 1.0 g $(CF_3SO_2)_2CH_2$, and 1.75 g 1,4-butanediol and this was heated 24 hours at 70° C. The resulting pale yellow oil from six such bottles was taken up in $CF_2ClCFCl_2$ and precipitated from toluene, yielding after stripping of the residual solvent 537 g of diol. Mn 5500 by nuclear ma gnetic resonance analysis. No detectable sulfone catalyst remained.

Example 24

Dispersion Comprising Fluorinated/Silicone Polymer of Formula (I) from Silicone Diol 5 and F-Diol-6.

A prepolymer was made in a 1-liter reaction flask equipped with a heating mantle, condenser, stirring blade, nitrogen inlet, and thermometer equipped with a temperature controller. IPDI, 77.10 grams (0.6936 eq.), Silicone Diol 5,157.97 grams (0.1734 eq.), F-Diol-6, 11.14 grams (0.0434 eq.), DMPA, 8.73 grams (0.1301 eq.), and NMP, 45.0 grams, were heated with stirring to 50–60° C. Next, 0.07 grams of DBTDL was added and the mixture was heated to 80° C. and allowed to react for 6 hours.

A premixture was made with 398.29 grams of distilled water, 6.0 grams of TEA, 4.84 grams (0.1610 eq.) of EDA, and 384 grams (0.0201 eq.) of Silane 1110.

The prepolymer, 160.00 grams (0.185 eq.), was added over 10 minutes to the premixture in a Microfluidics Homogenizer #HC-8000 at an air line pressure of 0.621 MPa. A stable dispersion was formed.

Example 25

Dispersion Comprising Fluorinated/Silicone Polymer of Formula (1) from Silicone Diol 5 and F-Diol-6.

The dispersion of Example 24, 95 grams was mixed for 5 minutes on an air-driven stirrer with 2 grams of Q-Thane QZ43 Crosslinker. Results are shown in Table 2.

Example 25A

Preparation of Tested Coatings of Examples 25

The dispersion prepared according to Example 25 was coated on a substrate. An approximately 1.6 mm thick wet film of the coating was poured onto 3M™ 5491 PTFE Extruded Film Tape attached to an aluminum panel substrate. The coating was allowed to dry and cure for seven days at 22° C. and 50% relative humidity. The resulting dry film was approximately 0.4 mm thick.

The resulting coated sample was designated as corresponding A samples. Contact angle, surface energy, tensile strength and elongation was measured for each coating. Water resistance was determined by immersion weight gain test. Results are shown in Table 2.

TABLE 2

Coated Film Properties

| EXAMPLE NUMBERS | % FLUORINE (calculated) | % SILICONE (calculated) | TENSILE (MPa) | ELONGATION (%) | CONTACT ANGLE in degrees (standard deviation) | SURFACE ENERGY (dyne/cm) | WATER WEIGHT GAIN (%) |
|---|---|---|---|---|---|---|---|
| 7A  | 37.3 | 0    | 8.5     | 97  | 104 (0.6) | 22.5 | 15.4 |
| 8A  | 3.0  | 31.9 | 7.2     | 62  | 92 (1.4)  | 29.5 | 15.7 |
| 9A  | 0.53 | 41.5 | BRITTLE | —   | 106 (1.7) | 34.4 | 0.4  |
| 10A | 30.8 | 0    | 15.5    | 53  | 93.0 (1.8) | 27.6 | 23.6 |
| 11A | 21.5 | 0    | 12.7    | 178 | 94.0 (1.6) | 30.8 | 6.6 |
| 12A | 43.8 | 0    | 6.9     | 58  | 108.0 (0.5) | 18.5 | 7.5 |
| 13A | 41.3 | 0    | 7.7     | 44  | 107.0 (1.4) | 20.8 | 6.4 |
| 14A | 25.3 | 16.6 | 12.1    | 41  | 105 (0.5) | 23.3 | 3.1 |
| 15A | 37.4 | 0    | 15.7    | 28  | 107 (1.0) | 183  | 113 |
| 16A | 32.9 | 0    | 8.1     | 6   | 100 (0.8) | 33.2 | 20 |
| 17A | 23.8 | 2.8  | 13.66   | 27  | 95.3 | 25.2 | 15.7 |
| 18A | 0.27 | 60.9 | 3.87    | 95  | 104.7 | 25.7 | 33.3 |
| 19A | 15.6 | 0    | 11.53   | 10.3 | 92 | 27.5 | 22 |
| 20A | 13.6 | 0    | 4.37    | 110 | 90.8 | 29.9 | 39.6 |
| 25A | 2.1  | 42.9 | 11.2    | 41  | 96.3 | 27.4 | 12.8 |

While this invention has been described in connection with specific embodiments, it should be understood that it is capable of further modification. The claims herein are intended to cover those variations which one skilled in the art would recognize as the equivalent of what has been described herein.

We claim:

1. A dispersion comprising polymer of formula (I)

(SIL-X)-ISO-Y-(POL-X-ISO-Y)$_n$~(CE-X-ISO-Y)$_m$~(WDC-X-ISO-Y)$_q$-(SIL)  (I)

wherein (POL-X-ISO-Y), (CE-X-ISO-Y), and (WDC-X-ISO-Y) can be randomly distributed or form blocks;

wherein SIL independently represents

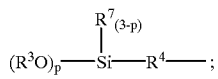

$R^3$ is independently selected from the group consisting of hydrogen; alkyl groups comprising about 1 to about 4 carbon atoms; acyl groups comprising about 2 to about 5 carbon atoms; and oxime groups of the formula —N=CR$^5$R$^6$, wherein R$^5$ is independently selected from the group consisting of monovalent alkyl groups comprising about 1 to about 12 carbon atoms and wherein R$^6$ is independently selected from the group consisting of monovalent alkyl groups comprising about 1 to about 12 carbon atoms;

$R^7$ is independently selected from the group consisting of monovalent alkyl groups comprising about 1 to about 12 carbon atoms;

$R^4$ is independently selected from the group consisting of divalent radicals comprising about 2 to about 20 carbon atoms, wherein said $R^4$ radicals contain no isocyanate reactive functional groups;

p independently represents an integer of 1 to 3;

X is independently selected from the group consisting of divalent radicals selected from the group consisting of

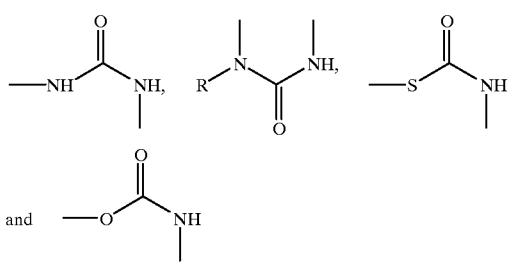

wherein R is independently selected from the group consisting of phenyl, linear aliphatic groups comprising about 1 to about 12 carbon atoms, branched aliphatic groups comprising about 1 to about 12 carbon atoms, and cycloaliphatic groups;

ISO independently represents a moiety derived from a polyisocyanate component comprising a compound having 2 isocyanate groups and optionally further comprising a compound having greater than 2 isocyanate groups;

wherein each ISO moiety is optionally fluorinated and optionally contains silicone;

Y is independently a divalent radical selected from the group consisting of

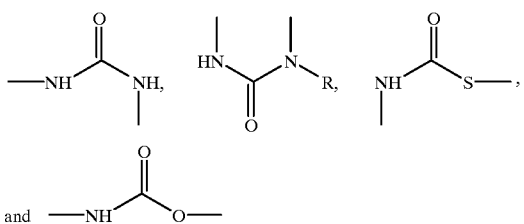

wherein R is as defined above;
POL independently represents a moiety derived from a component comprising a first compound having 2 isocyanate reactive functional groups selected from the group consisting of polyols, polyamines and polythiols, each isocyanate reactive functional group having at least one active hydrogen, and optionally a second compound having greater than 2 isocyanate reactive functional groups selected from the group consisting of polyols, polyamines, and polythiols, each isocyanate reactive functional group having at least one active hydrogen;
wherein at least one of the following of (i), (ii), and (iii) is true:
(i) at least one POL moiety contains fluorine;
(ii) at least one POL moiety contains silicone;
(iii) at least one POL moiety contains both fluorine and silicone;
n represents an integer of about 2 to about 85;
CE independently represents a moiety derived from a chain extender component comprising a difunctional chain extender having 2 isocyanate reactive functional groups, each isocyanate reactive functional group having at least one active hydrogen and optionally a polyfunctional chain extender having at least 3 isocyanate reactive functional groups, each isocyanate reactive functional group having at least one active hydrogen;
wherein each CE moiety is optionally fluorinated and optionally contains silicone;
m represents an integer of about 1 to about 84;
WDC independently represents a moiety derived from a water-dispersing compound, wherein the water dispersing compound possesses at least one water dispersing group and at least two isocyanate reactive functional groups, each isocyanate reactive functional group containing at least one active hydrogen;
q represents an integer of about 2 to about 85;
wherein at least one of the following is true:
at least one ISO moiety contains fluorine;
at least one ISO moiety contains silicone;
at least one ISO moiety contains both fluorine and silicone;
at least one CE moiety contains fluorine;
at least one CE moiety contains silicone;
at least one CE moiety contains both fluorine and silicone;
wherein a sufficient amount of at least one of the following:
(i) fluorine;
(ii) silicone;
(iii) fluorine plus silicone;
is present in the dispersion such that a coating of the dispersion has a surface energy of less than 35 dynes/cm.

2. The dispersion of claim 1 wherein a sufficient amount of at least one of the following:
(i) fluorine;
(ii) silicone;
(iii) fluorine plus silicone;
is present in the dispersion such that a coating of the dispersion has a surface energy of less than 25 dynes/cm.

3. The dispersion of claim 1 wherein a sufficient amount of at least one of the following:
(i) fluorine;
(ii) silicone;
(iii) fluorine plus silicone;
is present in the dispersion such that a coating of the dispersion has a surface energy of less than 18 dynes/cm.

4. The dispersion of claim 1 wherein n represents an integer of about 3 to about 65; m represents an integer of about 2 to about 64; and q represents an integer of about 3 to about 65.

5. The dispersion of claim 1 wherein n represents an integer of about 4 to about 15; m represents an integer of about 2 to about 64; and q represents an integer of about 4 to about 15.

6. The dispersion of claim 1 wherein $R^3$ is selected from the group consisting of ethyl and methyl; p is 3; and $R^4$ comprises 2 to 4 carbon atoms.

7. The dispersion of claim 1 wherein at least one ISO moiety is fluorinated.

8. The dispersion of claim 1 wherein at least one ISO moiety contains silicone.

9. The dispersion of claim 1 wherein at least one CE moiety is fluorinated.

10. The dispersion of claim 1 wherein at least one CE moiety contains silicone.

11. The dispersion of claim 9 wherein at least one ISO moiety is derived from a polyisocyanate component represented by the formula

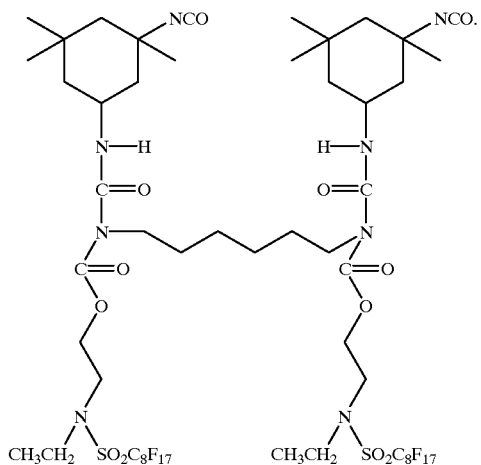

12. The dispersion of claim 8 wherein at least one ISO moiety is derived from a polyisocyanate component represented by the formula

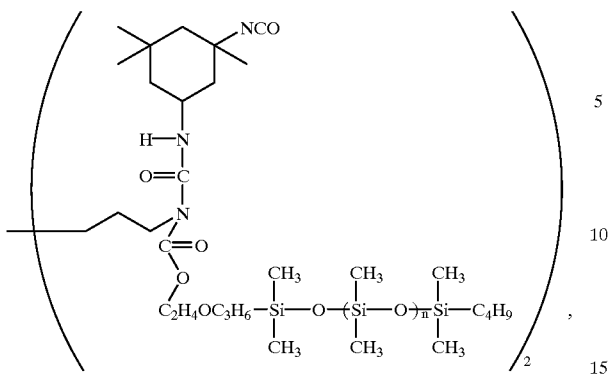

wherein n is 3 to 50.

13. The dispersion of claim 1 wherein said chain extender component is selected from the group consisting of fluorinated derivatives of compounds selected from the group consisting of 1,4-butanediol, ethylene glycol, diethylene glycol, dipropylene glycol, neopentyl glycol, 1,6-hexanediol, 1,4-cyclohexane dimethanol, bis(2-hydroxylethyl)hydroquinone, 4,4'-methylene bis(o-chloroaniline), 2,5-diethyl-2,4-toluene diamine, 4,4'-methylene bis(3-chloro-2,6-diethylaniline), propylene glycol bis(4,4'-aminobenzoate), 3,5-di(thiomethyl)-2,4-toluene diamine, methylene bis(4,4'-aniline), ethyl-1,2-di(2-amino thiophenol), 4-chloro-3,5-diamino isobutylbenzoate, 1,2-diaminoethane, N,N'-dialkyl(methylene dianiline), N,N'-dialkyl (1,4-diaminobenzene), and mixtures thereof.

14. The dispersion of claim 1 wherein said chain extender component is selected from the group consisting of fluorinated diols, fluorinated diamines, silicone diols, silicone diamines, and mixtures thereof.

15. The dispersion of claim 14 wherein said chain extender component is independently selected from the group consisting of

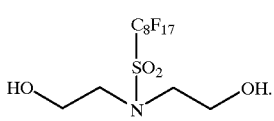

wherein $R_f''$ is a perfluoroalkyl group comprising 1 to 20 carbon atoms and $R_h$ is independently an alkyl group comprising 1 to 20 carbon atoms.

16. The dispersion of claim 14 wherein said chain extender component is

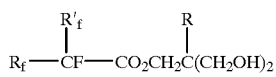

17. The dispersion of claim 14 wherein said chain extender component is

wherein;
$R_f$ is a $C_4$ to $C_6$ fluoroalkyl;
$R'_f$ is a $C_1$ to $C_3$ fluoroalkyl; and
R is a $C_1$ to $C_2$ alkyl.

18. The dispersion of claim 14 wherein said chain extender component is

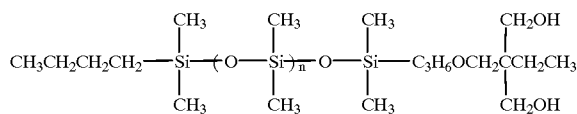

wherein n is an integer of 2 to 100.

19. The dispersion of claim 1 wherein SIL is derived from a component selected from the group consisting of
$H_2NCH_2CH_2CH_2Si(OC_2H_5)_3$;
$H_2NCH_2CH_2CH_2Si(OCH_3)_3$;

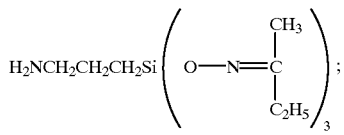

$HSCH_2CH_2CH_2Si(OCH_3)_3$;
$HO(C_2H_4O)_3C_2H_4N(CH_3)(CH_2)_3Si(OC_4H_9)_3$;
$H_2NCH_2C_6H_4CH_2CH_2Si(OCH_3)_3$;
$HSCH_2CH_2CH_2Si(OCOCH_3)_3$;
$HN(CH_3)CH_2CH_2Si(OCH_3)_3$;
$HSCH_2CH_2CH_2SiCH_3(OCH_3)_2$;
$(H_3CO)_3SiCH_2CH_2CH_2NHCH_2CH_2CH_2Si(OCH_3)_3$;
$HN(CH_3)C_3H_6Si(OCH_3)_3$;
$HN\{C_3H_6Si(OCH_3)\}_2$;
$CH_3CH_2OOCCH_2CH(COOCH_2CH_3)HNC_3H_6Si(OCH_2CH_3)_3$;
$C_6H_5HNC_3H_6Si(OCH_3)_3$;
$H_2NC_3H_6SiCH_3(OCH_2CH_3)_2$;
$HOCHCH_3CH_2OOCNHC_3H_6Si(OCH_2CH_3)_3$;
and mixtures thereof.

20. The dispersion of claim 1 which further comprises a silane compound reactive with the polymer of formula (I).

21. The dispersion of claim 1 which further comprises a silane compound reactive with the polymer of formula (I), wherein the silane compound contains at least one of the following:
 (i) fluorine;
 (ii) silicone.

22. The dispersion of claim 21 wherein said silane compound reactive with the polymer of formula (I) is fluorinated and selected from the group consisting of $R_f^1(Z)_xC_gH_{2g}SiQ_3$ wherein Q is independently selected from the group consisting of acyloxy, alkoxy, Cl and OH;
$R_f^1$ is selected from the group consisting of fluorinated $C_1$ to $C_{14}$ alkyl groups;
Z is a divalent linking group selected from the group consisting of $—C_gH_{2g}—$, $—C_gH_{2g}O—$ and $—SO_2NR^{11}—$; $R^{11}$ is an alkyl of $C_1$ to $C_6$; and
x is 0 or 1;
g is an integer from 1 to 12.

23. The dispersion of claim 22 wherein said silane compound reactive with the polymer of formula (I) is selected such that
Z is selected from the group consisting of $—SO_2NR^{11}—$ and $—C_gH_{2g}—$.

24. The dispersion of claim 23 wherein said silane compound is selected from the group consisting of
$C_8F_{17}SO_2N(CH_2CH_3)CH_2CH_2CH_2Si(OCH_3)_3$ and $C_8F_{17}C_2H_4Si(OCH_3)_3$.

25. The dispersion of claim 1 wherein said water dispersing compound is independently selected from the group consisting of
$\{H_2N(CH_2)_nCH_2\}_2NCH_3$ wherein n is an integer of 1 to 3;
$(HOCH_2)_2C(CH_3)COOH$;
$\{HO(CH_2)_nCH_2\}_2NCH_3$ wherein n is an integer of 1 to 3;
$H_2N-C_2H_4-NH-C_2H_4-SO_3H$;
$H_2N-C_3H_6-N(CH_3)-C_3H_6-SO_3H$;

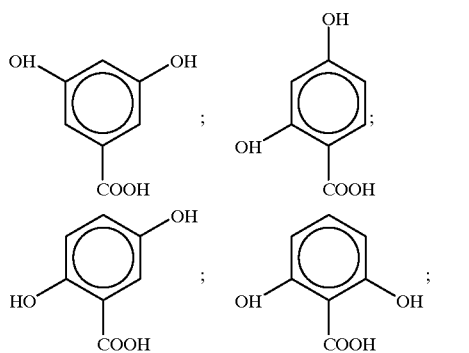

$HOCH_2-CH(OH)-CO_2Na$;
$\{(HOCH_2)_2CHCH_2-COO\}^-\{NH(CH_3)_3\}^+$;

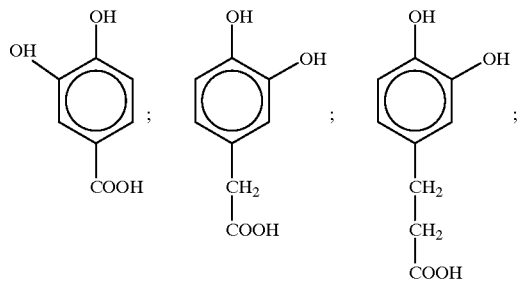

$CH_3(CH_2)_2CH(OH)-CH(OH)(CH_2)_3CO_2K$;
$(HOC_2H_4)_2N-C_3H_6-OSO_3Na$;
$\{H_2N-C_2H_4-NH-C_2H_4-N(CH_3)_3\}^+Cl^-$;

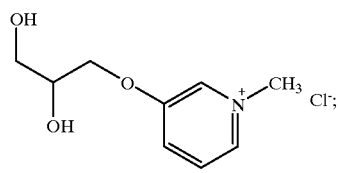

$(HOCH_2CH_2)_2NC_6H_4O(CH_2CH_2O)SO_2OH$;
$\{(H_2N)_2C_6H_3SO_3\}^-\{NH(C_2H_5)_3\}^+$; and mixtures thereof.

26. The dispersion of claim 1 wherein said basic salt forming compound is selected from the group consisting of ammonia, trimethylamine, triethylamine, tripropylamine, triisopropylamine, tributylamine, triethanolamine, diethanolamine, morpholine, N-methylmorpholine, dimethylethanolamine, and mixtures thereof.

27. The dispersion of claim 1 wherein with respect to POL said first compound and said second compound, if present, are independently selected from the group consisting of fluorinated polyols, silicone polyols, fluorinated polyamines, silicone polyamines, fluorinated polythiols, silicone polythiols, and mixtures thereof.

28. The dispersion of claim 1 wherein with respect to POL said first compound and said second compound, if present, are independently selected from the group consisting of fluorinated polyether polyols, silicone polyether copolymer diols, poly(oxypropylene) glycols, ethylene oxide capped poly(oxypropylene) glycols, poly(oxytetramethylene) glycols, µ-omega-diamino poly(oxypropylene), aromatic amine-terminated poly(oxypropylene) glycols, graft-polyether polyols, poly(oxyethylene) polyols, polyglycol adipates, polyethylene terephthalate polyols, polycaprolactone polyols, polybutadiene polyols, hydrogenated polybutadiene polyols, µ-omega-diamino poly(oxytetramethylene), polythioether polyols, polybutylene oxide polyols, polyoxytetramethylene/ethylene oxide random copolymer polyols, amine terminated silicone, acrylic polyols, polycarbonate polyols, and mixtures thereof.

29. The dispersion of claim 28 wherein said silicone polyether copolymer diol is represented by the formula

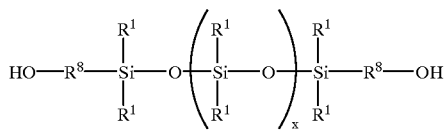

wherein the silicone polyether diol has two terminal hydroxy groups, wherein $R^8$ is independently selected from the group consisting of divalent alkyl groups of up to about 60 carbon atoms, divalent polyester groups of up to about 60 carbon atoms, and divalent oxyalkylene groups of up to about 60 carbon atoms, wherein the oxyalkylene groups contain 0 to 3 ethylene oxide units, and combinations thereof, wherein the atom of each $R^8$ group which is attached directly to the hydroxy group is a carbon atom; $R^1$ is independently selected from the group consisting of $C_1-C_{10}$ alkyl, fluoroalkyl, and fluoroalkoxyalkyl groups and x is an integer of from 2 to 100.

30. The dispersion of claim 29 wherein $R^8$ is an oxyalkylene group.

31. The dispersion of claim 29 wherein $R^8$ is an oxyalkylene group. comprising butylene oxide units.

32. The dispersion of claim 29 wherein $R^8$ is an oxyalkylene group comprising propylene oxide units.

33. The dispersion of claim 29 wherein $R^8$ is an oxyalkylene group containing 0 to 3 ethylene oxide units.

34. The dispersion of claim 29 wherein the silicone polyether copolymer diol is

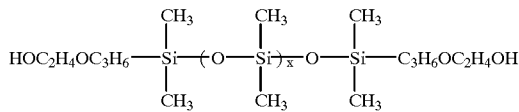

wherein x is an integer of from 2 to 100.

35. The dispersion of claim 27 wherein said POL moiety is derived from a fluorinated polyether polyol independently selected from a group represented by the formula

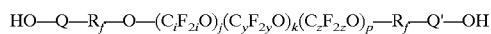

wherein oxyperfluoroalkylene groups —$(C_iF_{2i}O)$—, —$(C_yF_{2y}O)$—, and —$(C_zF_{2z}O)$— are randomly distributed or grouped in blocks in a chain;

i is an integer from 1 to 10;
j is an integer from 0 to 100;
k is an integer from 1 to 100;
p is an integer from 0 to 100;
y is an integer from 1 to 10;
z is an integer from 1 to 10;
each $R_f$ is independently selected from the group consisting of divalent perfluoroalkyl groups comprising from 1 to 20 carbon atoms; and
each Q is independently selected from the group consisting of —$C_6H_4$—, —$C_6H_3Cl$—, —$C_2H_4OCH_2$— and —$C_bH_{2b}$—;
each Q' is independently selected from the group consisting of —$C_6H_4$—, —$C_6H_3Cl$—, —$C_bH_{2b}$—, and —$CH_2OC_2H_4$—; and each b is independently selected from the group consisting of integers of 1 to 20.

36. The dispersion of claim 35 wherein said fluorinated polyether polyol is independently selected from a group represented by the formula $$HOCH_2CF_2(OCF_2CF_2)_k(OCF_2)_jCH_2OH$$

wherein

and the number average molecular weight of the fluorinated polyether polyol is 2000.

37. The dispersion of claim 27 wherein said POL moiety is derived from a fluorinated polyol independently selected from a group represented by the formula $$HOCH_2C_3F_6\text{—}O\text{—}(CF_2CF_2CF_2CF_2\text{—}O)_h\text{—}C_3F_6CH_2OH$$

wherein h is an integer from 0 to 30.

38. The dispersion of claim 27 wherein said fluorinated polyol is independently selected from a group represented by the formula

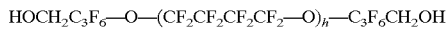

wherein a is an integer from 1 to 5;
c is 1 or 2;
d is an integer from 2 to 250;
$R^9$ is selected from the group consisting of $C_2$ to $C_5$ alkylene and $C_2$ to $C_5$ isoalkylene;
$R^{10}$ is independently selected from the group consisting of H and alkyl groups comprising 1 to 4 carbon atoms; and
$R_f'$ is independently selected from the group consisting of a linear $C_2$ to $C_{10}$ perfluoroalkyl, branched chain $C_2$ to $C_{10}$ perfluoroalkyl, haloalkyl comprising 1 to 20 carbon atoms, haloisoalkyl comprising 1 to 20 carbon atoms, and oxaperfluorinated polyether segments comprising 4 to 60 carbon atoms.

39. The dispersion of claim 38 wherein $R_f'$ is —$CF_2CF_2CF_3$ and a=c=1.

40. The dispersion of claim 38 wherein $R_f'$ is —$C_2F_5$ and a=c=1.

41. The dispersion of claim 38 wherein $R_f'$ is —$C_7F_{15}$ and a=c=1.

42. The dispersion of claim 27 wherein said fluorinated diol is independently selected from a group represented by the formula

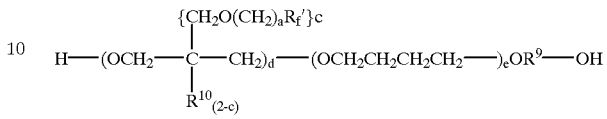

wherein
e is an integer selected such that the weight fraction of —$(OCH_2CH_2CH_2CH_2)$— is 0 to about 70 weight percent of the diol;
a is an integer from 1 to 5;
c is 1 or 2;
d is an integer from 2 to 250;
$R^9$ is selected from the group consisting of $C_2$ to $C_5$ alkylene and $C_2$ to $C_5$ isoalkylene;
$R^{10}$ is independently selected from the group consisting of H and alkyl groups comprising 1 to 4 carbon atoms; and
$R_f'$ is independently selected from the group consisting of a linear $C_2$ to $C_{10}$ perfluoroalkyl, branched chain $C_2$ to $C_{10}$ perfluoroalkyl, haloalkyl comprising 1 to 20 carbon atoms, halo lsoalkyl comprising 1 to 20 carbon atoms, and oxaperfluorinated polyether segments comprising 4 to 60 carbon atoms.

43. The dispersion of claim 27 wherein said fluorinated diol is independently selected from a group represented by the formula

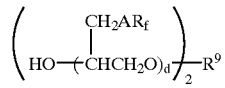

wherein
A is independently selected from the group consisting of —$OC_gH_{2g}$— and —$N(R^{11})SO_2$—, wherein a is an integer from 1 to 12;
d is an integer from 2 to 250;
$R^9$ is selected from the group consisting of alkylene groups comprising at least 2 carbon atoms and isoalkylene groups comprising at least 2 carbon atoms;
$R^{11}$ is a $C_1$ to $C_6$ alkyl;
$R_f$ is independently selected from the group consisting of a linear $C_2$ to $C_{10}$ perfluoroalkyl, branched chain $C_2$ to $C_{10}$ perfluoroalkyl, haloalkyl comprising 1 to 20 carbon atoms, haloisoalkyl comprising 1 to 20 carbon atoms, and oxaperfluorinated polyether segments comprising 4 to 60 carbon atoms.

44. The dispersion of claim 27 wherein said fluorinated polyols have a number average molecular weight of about 500 to about 35,000.

45. The dispersion of claim 27 wherein said fluorinated polyols have a number average molecular weight of about 1,000 to about 10,000.

46. A film comprising a cured dispersion of claim 1.

47. A film comprising a cured dispersion of claim 20 wherein at least one of the following is true:
   (i) the polymer of formula (I) and the silane compound have a total combined fluorine content of about 5 to about 75% by weight, based upon the total weight of the polymer of formula (I) plus the silane compound;

(ii) the polymer of formula (I) and the silane compound have a total combined silicone content of about 10 to about 90% by weight, based upon the total weight of the polymer of formula (I) plus the silane compound;

(iii) the polymer of formula (I) and the silane compound have a total combined content of silicone plus fluorine ranging from about 10 to about 90% based upon the total weight of the polymer of formula (I) plus the silane compound.

48. A film comprising a cured dispersion of claim 20 wherein at least one of the following is true:

(i) the polymer of formula (I) and the silane compound have a total combined fluorine content of about 10 to about 75% by weight, based upon the total weight of the polymer of formula (I) plus the silane compound;

(ii) the polymer of formula (I) and the silane compound have a total combined silicone content of about 15 to about 90% by weight, based upon the total weight of the polymer of formula (I) plus the silane compound;

(iii) the polymer of formula (I) and the silane compound have a total combined content of silicone plus fluorine ranging from about 20 to about 90% by weight based upon the total weight of the polymer of formula (I) plus the silane compound.

49. A film comprising a cured dispersion of claim 20 wherein at least one of the following is true:

(i) the polymer of formula (I) and the silane compound have a total combined fluorine content of about 20 to about 75% by weight, based upon the total weight of the polymer of formula (I) plus the silane compound;

(ii) the polymer of formula (I) and the silane compound have a total combined silicone content of about 20 to about 90% by weight, based upon the total weight of the polymer of formula (I) plus the silane compound;

(iii) the polymer of formula (I) and the silane compound have a total combined content of silicone plus fluorine ranging from about 30 to about 90% by weight based upon the total weight of the polymer of formula (I) plus the silane compound.

50. A film comprising a cured dispersion of claim 20 wherein at least one of the following is true:

(i) the polymer of formula (I) and the sitane compound have a total combined fluorine content of about 20 to about 75% by weight, based upon the total weight of the polymer of formula (I) plus the silane compound;

(ii) the polymer of formula (I) and the silane compound have a total combined silicone content of about 20 to about 80% by weight, based upon the total weight of the polymer of formula (I) plus the silane compound;

(iii) the polymer of formula (I) and the silane compound have a total combined content of silicone plus fluorine ranging from about 30 to about 80% by weight based upon the total weight of the polymer of formula (I) plus the silane compound.

51. A film comprising a cured dispersion of claim 1 wherein at least one of the following is true:

(i) the polymer of formula (I) has a fluorine content of about 5 to about 75% by weight, based upon the total weight of the polymer of formula (I);

(ii) the polymer of formula (I) has a silicone content of about 10 to about 90% by weight, based upon the total weight of the polymer of formula (I);

(iii) the polymer of formula (I) contains both silicone and fluorine, and the total content of silicone plus fluorine in the polymer of formula (I) ranges from about 10 to about 90% based upon the total weight of the polymer of formula (I).

52. A film comprising a cured dispersion of claim 1 wherein at least one of the following is true:

(i) the polymer of formula (I) has a fluorine content of about 10 to about 75% by weight, based upon the total weight of the polymer of formula (I);

(ii) the polymer of formula (I) has a silicone content of about 15 to about 90% by weight, based upon the total weight of the polymer of formula (I);

(iii) the polymer of formula (I) contains both silicone and fluorine, and the total content of silicone plus fluorine in the polymer of formula (I) ranges from about 20 to about 90% by weight based upon the total weight of the polymer of formula (I).

53. A film comprising a cured dispersion of claim 1 wherein at least one of the following is true:

(i) the polymer of formula (I) has a fluorine content of about 20 to about 75% by weight, based upon the total weight of the polymer of formula (I);

(ii) the polymer of formula (I) has a silicone content of about 20 to about 90% by weight, based upon the total weight of the polymer of formula (I);

(iii) the polymer of formula (I) contains both silicone and fluorine, and the total content of silicone plus fluorine in the polymer of formula (I) ranges from about 30 to about 90% by weight based upon the total weight of the polymer of formula (I).

54. A film comprising a cured dispersion of claim 1 wherein at least one of the following is true:

(i) the polymer of formula (I) has a fluorine content of about 20 to about 75% by weight, based upon the total weight of the polymer of formula (I);

(ii) the polymer of formula (I) has a silicone content of about 20 to about 80% by weight, based upon the total weight of the polymer of formula (I);

(iii) the polymer of formula (I) contains both silicone and fluorine, and the total content of silicone plus fluorine in the polymer of formula (I) ranges from about 30 to about 80% by weight based upon the total weight of the polymer of formula (I).

55. The film of claim 46 which has a water weight gain of less than 15 percent when subjected to a water immersion weight gain test.

56. The film of claim 46 which has a water weight gain of less than 10 percent when subjected to a water immersion weight gain test.

57. The film of claim 46 which has a water weight gain of less than 5 percent when subjected to a water immersion weight gain test.

58. An elastomer comprising the cured dispersion of claim 1.

59. An article comprising a substrate coated with the cured dispersion of claim 1.

60. A composition comprising:

(a) about 80 to about 99.9 percent by weight of the dispersion of claim 1, which comprises the polymer of formula (I);

(b) about 0.1 to about 10 percent by weight of a photo-stabilizer;

(c) 0 to about 10 percent by weight of a surfactant;

(d) about 0.1 to about 10 percent by weight of a thickening agent;

(e) about 0.1 to about 10 percent by weight of a coalescing solvent;

(f) about 0.1 to about 20 percent by weight of a silane compound reactive with the polymer of formula (I);

(g) 0 to about 20 percent by weight of a component selected from the group consisting of pigments, dyes, and mixtures thereof;

(h) 0 to about 5 percent by weight of a crosslinker;

(i) 0 to about 5 percent by weight of an antioxidant;

(j) 0 to about 10 percent by weight of an organic biocide;

(k) 0 to about 30 percent by weight of plasticizer (l) 0 to about 20 percent by weight of a non-toxic leachable inert silicone fluid antifouling agent; wherein the weight percentages are based upon the total weight of the coating composition and total 100%.

61. An article comprising a substrate coated with the composition of claim 60.

62. An article comprising a substrate coated with the cured composition of claim 61.

63. The article of claim 62 wherein the substrate is selected from the group consisting of boat hulls, buoys, pipes, tape, drilling platforms, piers, docks, oil production rigs, sea walls and fish nets.

64. The article of claim 62 wherein the substrate is selected from the group consisting of leather, woven webs, nonwoven webs, glass, glass fibers, wood, metals, plastics, metal alloys and composite materials.

65. The article of claim 62 wherein the substrate is a composite material selected from the group consisting of concrete and fiber glass and the metal alloy is selected from a group consisting of aluminum and steel.

66. The article of claim 62 wherein the composition further comprises a photostabilizer.

67. The dispersion of claim 1 which is anionically stabilized.

68. The dispersion of claim 1 which is cationically stabilized.

69. The dispersion of claim 1 which is nonionically stabilized.

70. The dispersion of claim 14 wherein said chain extender component is

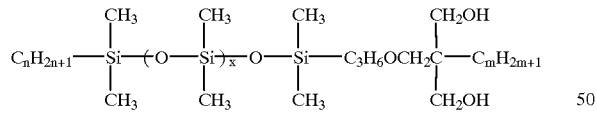

wherein x is an integer of 2 to 100, n is an integer of 1 to 20, and m is an integer of 1 to 20.

71. The dispersion of claim 29 wherein the silicone polyether copolymer diol is

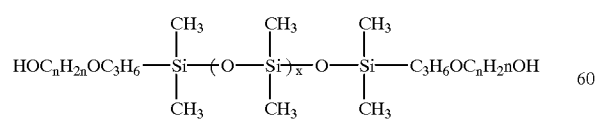

wherein n is independently 2 to 6; and
x is an integer of 2 to 100.

72. The dispersion of claim 28 wherein the fluorinated polyether polyol is independently selected from a group represented by the formula $HOCH_2CH_2CH_2CHR(OCHRCH_2CH_2CHR)_xOCHRCH_2CH_2CH_2OH$ wherein each R is independently selected from the group consisting of $-H$, $-CF_2CHFR_f$ wherein each $R_f$ is independently selected from the group consisting of $-(CF_2)_nF$ wherein n=0–8 and

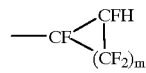

wherein m=2 to 4, such that 5–60 weight percent of the diol weight is fluorine and x=0–70.

73. The dispersion of claim 72 wherein $R_f$ is $-CF_3$.

74. A dispersion comprising a polymer of formula (I):

$$(SIL\text{-}X\text{-}ISO\text{-}Y)\text{-}(POL\text{-}X\text{-}ISO\text{-}Y)_n\text{~}(CE\text{-}X\text{-}ISO\text{-}Y)_m\text{~}(WDC\text{-}X\text{-}ISO\text{-}Y)_q\text{-}(SIL) \qquad (I)$$

wherein (POL-X-ISO-Y), (CE-X-ISO-Y), and (WDC-X-ISO-Y) can be randomly distributed or form blocks; wherein:

n represents an integer from about 2 to about 85;

m represents an integer from about 1 to about 84;

q represents an integer from about 2 to about 85;

WDC is derived from α,α-bis(hydroxymethyl) propionic acid ammonium salt;

ISO is derived from dicyclohexylmethane 4,4' diisocyanate;

SIL represents:

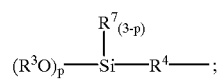

wherein $R^3$ is ethyl;

p is 3; and $R^4$ comprises 3 carbon atoms;

POL is derived from:

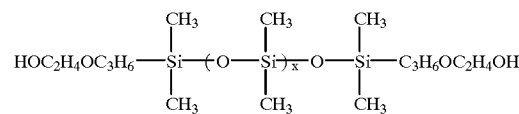

wherein x is an integer of from 2 to 100;

X is independently selected from the group consisting of divalent radicals selected from the group consisting of:

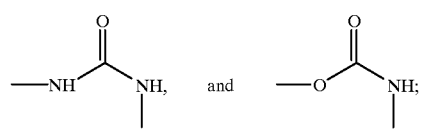

Y is independently a divalent radical selected from the group consisting of:
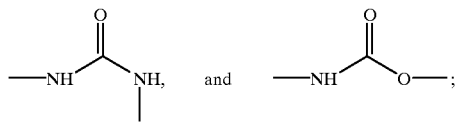
CE is derived from the chain extender compound:
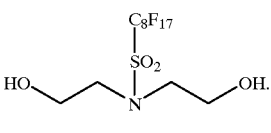
* * * * *

UNITED STATES PATENT AND TRADEMARK OFFICE
CERTIFICATE OF CORRECTION

PATENT NO. : 6,313,335 B1
DATED : November 6, 2001
INVENTOR(S) : Roberts, Gary P.

It is certified that error appears in the above-identified patent and that said Letters Patent is hereby corrected as shown below:

Column 1,
Line 22, delete "a" following --fouling--

Column 4,
Line 37, delete "oli comers" and insert in place thereof -- oligomers --.

Column 5,
Line 20, delete "o" following "antifouling".
Line 40, delete "o" following "crosslinking".

Column 7,
Line 37, delete "least3" and insert in place thereof -- least 3 --.

Column 10,
Lines 2 and 4, delete "3to" and insert in place thereof -- 3 to --.

Column 11,
Line 63, delete "3to" and insert in place thereof -- 3 to --.

Column 14,
Line 62, delete "3ethylene" and insert in place thereof -- 3 ethylene --.

Column 15,
Line 4, delete "3ethylene" and insert in place thereof -- 3 ethylene --.

Column 17,
Lines 23-25, delete "oxapcr - fluorinated" and insert in place thereof
-- oxaperfluorinated --.

Column 18,
Line 14, delete "factone" and insert in place thereof -- lactone --.
Lines 21-22, delete "poly carbonate" and insert in place thereof -- polycarbonate --.

Column 22,
Line 6, delete "dispersion" and insert in place thereof -- dispersions --.

Column 23,
Line 17, delete "y" following "having".

Column 24,
Line 51, insert --wherein n is an integer of 2 to 100. --.

UNITED STATES PATENT AND TRADEMARK OFFICE
CERTIFICATE OF CORRECTION

PATENT NO. : 6,313,335 B1
DATED : November 6, 2001
INVENTOR(S) : Roberts, Gary P.

It is certified that error appears in the above-identified patent and that said Letters Patent is hereby corrected as shown below:

Column 27,
Line 24, delete "ter m ninated" and insert in place thereof -- terminated --.
Line 26, delete "or ganic" and insert in place thereof -- organic --.
Line 48, delete "ar gon," and insert in place thereof -- argon, --.

Column 28,
Line 56, delete "homo g aenizer's" and insert in place thereof -- homogenizer's --.

Column 29,
Line 36, delete "y" following "coating".
Line 40, delete "a gents" and insert in place thereof -- agents --.
Line 41, delete "antifoulin" and insert in place thereof -- antifouling --.
Line 46, delete "or ganic antifouling c" and insert in place thereof -- organic antifouling --.
Line 57, delete "rganisms" and insert in place thereof -- organisms --.
Line 63, delete "coating s)" and insert in place thereof -- coatings) --.

Column 30,
Line 61, delete "rosslinker;" and insert in place thereof -- crosslinker; --.

Column 32,
Line 16, delete "(1cos $\Theta_1$)" and insert in place thereof -- (1+cos $\Theta_1$) --.
Line 46, delete "tow" and insert in place thereof -- low --.
Line 55, delete "Testino" and insert in place thereof -- Testing --.
Line 63, delete "stren gth" and insert in place thereof -- strength --.

Column 35,
Line 8, delete "wei ght" and insert in place thereof -- weight --.
Line 53, delete "266 3" and insert in place thereof -- 2663 --.

Column 38,
Line 18, delete "nitro gen" and insert in place thereof -- nitrogen --.
Line 21, delete "(0.09 3" and insert in place thereof -- (0.093 --.
Line 23, delete "rams" and insert in place thereof -- grams --.
Line 46, delete "nitrigen" and insert in place thereof -- nitrogen --.
Line 48, delete "g rams" and insert in place thereof -- grams --.

UNITED STATES PATENT AND TRADEMARK OFFICE
CERTIFICATE OF CORRECTION

PATENT NO. : 6,313,335 B1
DATED : November 6, 2001
INVENTOR(S) : Roberts, Gary P.

It is certified that error appears in the above-identified patent and that said Letters Patent is hereby corrected as shown below:

Column 39,
Line 3, delete "y" following "Comprising".
Line 6, delete "nitrigen" and insert in place thereof -- nitrogen --.
Line 12, delete "55. 3)7" and insert in place thereof -- 55.37 --.
Line 16, delete "g rams" and insert in place thereof -- grams --.
Lines 26 and 53, delete "stren gth" and insert in place thereof -- strength --.
Line 48, delete "Homo genizer" and insert in place thereof -- Homogenizer --.
Line 61, delete "nitro en" and insert in place thereof -- nitrogen --.
Line 63, delete "g Orams" and insert in place thereof -- grams --.

Column 40,
Line 10, delete "se gment" and insert in place thereof -- segment --.
Line 16, delete "nitrigen" and insert in place thereof -- nitrogen --.
Line 27, delete "237.10grams" and insert in place thereof -- 237.10 grams --.
Line 38, delete "Homo genizer" and insert in place thereof -- Homogenizer --.
Line 38, delete "621" and insert in place thereof -- 0.621 Mpa. --.

Column 41.
Line 1, delete "nitrigen" and insert in place thereof -- nitrogen --.
Line 66, delete "nitrigen" and insert in place thereof -- nitrogen --.

Column 42.
Line 33, delete "Homo genizer" and insert in place thereof -- Homogenizer --.

Column 43.
Line 18, delete "Si ticone" and insert in place thereof -- Silicone --.
Line 23, delete "nitrigen" and insert in place thereof -- nitrogen --.
Line 31, delete "Apremixture" and insert in place thereof -- A premixture --.

Column 44,
Lines 13, 35 and 57, delete "nitrigen" and insert in place thereof -- nitrogen --.

Column 45,
Line 12, delete "nitrigen" and insert in place thereof -- nitrogen --.
Line 43, delete "stren gth" and insert in place thereof -- strength --.

Column 46,
Line 23, delete "NAOH" and insert in place thereof -- NaOH --.
Line 34, delete "ma gnetic" and insert in place thereof -- magnetic --.

UNITED STATES PATENT AND TRADEMARK OFFICE
CERTIFICATE OF CORRECTION

PATENT NO. : 6,313,335 B1
DATED : November 6, 2001
INVENTOR(S) : Roberts, Gary P.

It is certified that error appears in the above-identified patent and that said Letters Patent is hereby corrected as shown below:

<u>Column 52,</u>
Line 61, delete "0or 1;" and insert in place thereof -- 0 or 1; --.

<u>Column 56,</u>
Line 29, delete "halo Isoalkyl" and insert in place thereof -- haloisoalkyl --.

<u>Column 57,</u>
Line 45, delete "sitane" and insert in place thereof -- silane --.

Signed and Sealed this

Tenth Day of February, 2004

JON W. DUDAS
*Acting Director of the United States Patent and Trademark Office*